US012554067B2

(12) United States Patent
Chern et al.

(10) Patent No.: US 12,554,067 B2
(45) Date of Patent: Feb. 17, 2026

(54) PHOTONIC STRUCTURE WITH OXIDE STRUCTURE IN SEMICONDUCTOR SUBSTRATE AND METHOD FOR FORMING THE SAME

(71) Applicant: Taiwan Semiconductor Manufacturing Company, Ltd., Hsinchu (TW)

(72) Inventors: Chan-Hong Chern, Palo Alto, CA (US); Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 58 days.

(21) Appl. No.: 18/753,561

(22) Filed: Jun. 25, 2024

(65) Prior Publication Data

US 2024/0345322 A1 Oct. 17, 2024

Related U.S. Application Data

(63) Continuation of application No. 18/165,098, filed on Feb. 6, 2023, now Pat. No. 12,032,204, which is a continuation of application No. 17/521,055, filed on Nov. 8, 2021, now Pat. No. 11,573,373, which is a continuation of application No. 16/919,747, filed on Jul. 2, 2020, now Pat. No. 11,169,328.

(60) Provisional application No. 62/903,028, filed on Sep. 20, 2019.

(51) Int. Cl.

| | |
|---|---|
| ***G02B 6/136*** | (2006.01) |
| ***G02B 6/122*** | (2006.01) |
| *G02B 6/12* | (2006.01) |

(52) U.S. Cl.
CPC .......... *G02B 6/136* (2013.01); *G02B 6/1225* (2013.01); *G02B 2006/12176* (2013.01)

(58) Field of Classification Search
CPC ........ G02B 6/136; G02B 6/1225; G02B 6/14; G02B 6/10; G02B 6/125; G02B 2006/12176; G02B 2006/12061; B82Y 20/00; B82Y 40/00
See application file for complete search history.

(56) References Cited

U.S. PATENT DOCUMENTS

| | | | |
|---|---|---|---|
| 5,689,358 | A | 11/1997 | Nakao et al. |
| 6,993,225 | B2 | 1/2006 | Patel et al. |
| 7,606,448 | B2 | 10/2009 | Forbes et al. |
| 8,213,015 | B2 | 7/2012 | Kraizcek et al. |
| 9,005,458 | B2 | 4/2015 | Sandhu et al. |
| 9,305,826 | B2 | 4/2016 | Meade et al. |
| 9,348,099 | B2 | 5/2016 | Krishnamurthi et al. |
| 9,568,674 | B2 | 2/2017 | Sandhu et al. |
| 9,703,039 | B2 | 7/2017 | Pan et al. |

(Continued)

*Primary Examiner* — Andrew Jordan
(74) *Attorney, Agent, or Firm* — Birch, Stewart, Kolasch & Birch, LLP

(57) ABSTRACT

A photonic structure is provided. The photonic structure includes an oxide structure surrounded by a semiconductor substrate, a buried oxide layer over the semiconductor substrate, and an optical coupling region over the buried oxide layer. The oxide structure has a first side surface and a second side surface opposite to the first side surface. In a plan view, the optical coupling region is tapered from the first side surface of the oxide structure to the second side surface of the oxide structure.

20 Claims, 32 Drawing Sheets

(56) References Cited

U.S. PATENT DOCUMENTS

| | | | | |
|---|---|---|---|---|
| 9,709,734 | B2 | 7/2017 | Krishnamurthi et al. | |
| 9,810,843 | B2 | 11/2017 | Stephens et al. | |
| 9,829,626 | B2 | 11/2017 | Shubin et al. | |
| 10,197,733 | B2 | 2/2019 | Pan et al. | |
| 10,816,738 | B2 | 10/2020 | Mathai et al. | |
| 11,169,328 | B2 | 11/2021 | Chern et al. | |
| 11,508,658 | B2 * | 11/2022 | Lu | H01L 24/45 |
| 11,567,262 | B2 * | 1/2023 | Bruck | G02B 6/305 |
| 11,573,373 | B2 * | 2/2023 | Chern | G02B 6/14 |
| 11,803,009 | B2 * | 10/2023 | Pandey | H10D 86/01 |
| 11,906,781 | B2 * | 2/2024 | Bruck | G02B 6/305 |
| 12,032,204 | B2 * | 7/2024 | Chern | G02B 6/14 |
| 12,332,478 | B2 * | 6/2025 | Huang | G02B 6/12004 |
| 12,386,119 | B2 * | 8/2025 | Liu | G02B 6/305 |
| 12,405,422 | B2 * | 9/2025 | Chern | G02B 6/136 |
| 2005/0175286 | A1 | 8/2005 | Patel et al. | |
| 2010/0277722 | A1 | 11/2010 | Kraiczek et al. | |
| 2013/0272646 | A1 | 10/2013 | Fish et al. | |
| 2014/0241682 | A1 | 8/2014 | Sandhu et al. | |
| 2014/0341503 | A1 | 11/2014 | Meade et al. | |
| 2014/0363120 | A1 | 12/2014 | Stephens et al. | |
| 2015/0192737 | A1 | 7/2015 | Sandhu et al. | |
| 2015/0293303 | A1 | 10/2015 | Pan et al. | |
| 2016/0018610 | A1 | 1/2016 | Krishnamurthi et al. | |
| 2016/0209589 | A1 | 7/2016 | Krishnamurthi et al. | |
| 2016/0274302 | A1 | 9/2016 | Kuo et al. | |
| 2016/0291249 | A1 | 10/2016 | Czornomaz et al. | |
| 2016/0359566 | A1 | 12/2016 | Yu et al. | |
| 2017/0199328 | A1 | 7/2017 | Shubin et al. | |
| 2017/0219777 | A1 | 8/2017 | Pan et al. | |
| 2017/0307834 | A1 | 10/2017 | Mathai et al. | |
| 2018/0088290 | A1 | 3/2018 | Fish et al. | |
| 2019/0137404 | A1 | 5/2019 | Lai et al. | |
| 2021/0088726 | A1 | 3/2021 | Chern et al. | |
| 2021/0223473 | A1 | 7/2021 | Bian et al. | |
| 2021/0313259 | A1 * | 10/2021 | Lu | G02B 6/4214 |
| 2022/0057577 | A1 | 2/2022 | Chern et al. | |
| 2022/0206220 | A1 | 6/2022 | Barwicz et al. | |
| 2022/0244459 | A1 | 8/2022 | Bruck et al. | |
| 2023/0185024 | A1 | 6/2023 | Chern et al. | |
| 2024/0345322 | A1 * | 10/2024 | Chern | G02B 6/1225 |

* cited by examiner

PHOTONIC STRUCTURE WITH OXIDE STRUCTURE IN SEMICONDUCTOR SUBSTRATE AND METHOD FOR FORMING THE SAME

PRIORITY CLAIM

This application is a Continuation Application of U.S. application Ser. No. 18/165,098, filed on Feb. 6, 2023 and entitled "PHOTONIC STRUCTURE AND METHOD FOR FORMING THE SAME," Which is a Continuation Application of U.S. application Ser. No. 17/521,055, filed on Nov. 8, 2021 (now U.S. Pat. No. 11,573,373) and entitled "PHOTONIC STRUCTURE AND METHOD FOR FORMING THE SAME," Which is a Continuation Application of U.S. application Ser. No. 16/919,747, filed on Jul. 2, 2020 (now U.S. Pat. No. 11,169,328) and entitled "PHOTONIC STRUCTURE AND METHOD FOR FORMING THE SAME," which claims the benefit of U.S. Provisional Application No. 62/903,028, filed on Sep. 20, 2019 and entitled "OPTICAL COUPLING DEVICE AND METHOD FOR FORMING THE SAME," all of which are incorporated herein by reference.

BACKGROUND

Optical signaling and processing have been used in increasingly more applications in recent years, particularly due to the use of optical fiber-related applications for signal transmission. Optical waveguides are often used as components in optical circuits having multiple photonic functions (such as an integration of image sensors, optical communications, opto-electric circuits, spectrum analysis devices as well as other technologies). In general, an optical signal is confined in the waveguide structure by a total internal reflection from the waveguide walls. A waveguide taper is used to facilitate a high coupling efficiency between the waveguide (e.g., a strip waveguide) and an external optical component (e.g., optical fiber). However, the manufacturing of the waveguide structure has challenges.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 1A-1, 1C-1, 1D-1, 1G-1 and 1I-1 are plan views of the photonic structure of FIGS. 1A, 1C, 1D, 1G and 1I, respectively, in accordance with some embodiments of the disclosure.

FIGS. 1A-2, 1C-2, 1D-2, 1G-2 and 1I-2 are cross-sectional views of the photonic structure of FIGS. 1A, 1C, 1D, 1G and 1I, respectively, in accordance with some embodiments of the disclosure.

FIGS. 3A-1, 3B-1, 3C-1, 3D-1, 3G-1 and 3I-1 are plan views of the photonic structure of FIGS. 3A, 3B, 3C, 3D, 3G and 3I respectively, in accordance with some embodiments of the disclosure.

FIGS. 3A-2, 3B-2, 3C-2, 3D-2, 3G-2 and 3I-2 are cross-sectional views of the photonic structure of FIGS. 3A, 3B, 3C, 3D, 3G and 3I, respectively, in accordance with some embodiments of the disclosure.

DETAILED DESCRIPTION

Figure 1A:
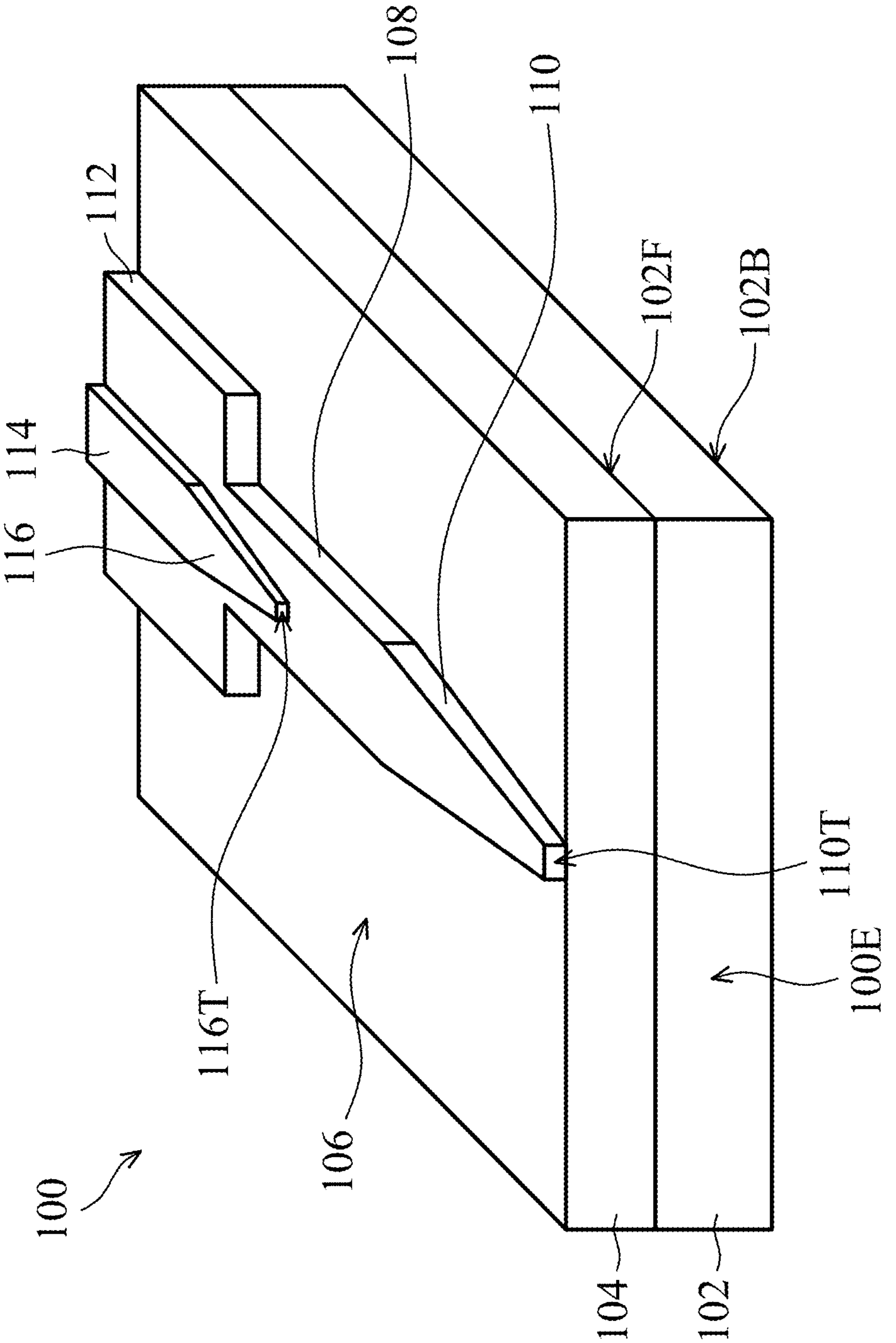
FIGS. 1A through 1I are perspective views illustrating the formation of a photonic structure at various intermediate stages, in accordance with some embodiments of the disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numerals are used to designate like elements. It should be understood that additional operations can be provided before, during, and after the method, and some of the operations described can be replaced or eliminated for other embodiments of the method.

Furthermore, when a number or a range of numbers is described with "about," "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

Silicon-on-insulator (SOI) substrates are attractive for implements in photonic integrated circuits (PIC). For example, compact integration of various optical components may be achieved on a small chip. In addition, a silicon waveguide is able to confine infrared light (about 700 nm to about 1 mm) due to its silicon core layer having a strong refractive index (about 3.47) in contrast to its silicon oxide cladding layers (about 1.45). In order to transmit optical signals from a chip to an external device and/or receive optical signals from an external device to the chip, the silicon waveguide in a PIC chip is required to couple with an external optical fiber. An extremely large dimension difference between the core layer of the waveguide and the optical fiber results in the optical fiber having a much larger optical mode field in comparison to the optical mode field of the silicon waveguide. Direct coupling between a waveguide and an optical fiber may incur tremendous optical signal loss due to the mode size mismatch. A mode conversion is therefore desirable in order to reduce optical coupling loss. It is essential to meticulously design a waveguide tip for light mode expansion to match it with the fiber dimension. The waveguide tip coupling to the optical fiber may also be referred to as an edge coupler, an optical mode converter or a spot-size converter.

The present disclosure, in some embodiments, relates to a photonic structure having an edge coupler. The edge coupler may include an optical coupling region (core layer) and a cladding layer surrounding the optical coupling region. The cladding layer may include an oxide structure embedded in the semiconductor substrate. An area of the optical coupling region may be confined within an area of the oxide structure in a plan view, and therefore optical signals may be prevented from escaping to the semiconductor substrate when the photonic structure is coupled to an external optical fiber.

FIGS. 1A through 1I are perspective views illustrating the formation of a photonic structure at various intermediate stages, in accordance with some embodiments of the disclosure. FIGS. 1A-1, 1C-1, 1D-1, 1G-1 and 1I-1 are plan views of the photonic structure of FIGS. 1A, 1C, 1D, 1G and 1I, respectively, in accordance with some embodiments of the disclosure. FIGS. 1A-2, 1C-2, 1D-2, 1G-2 and 1I-2 are cross-sectional views taken along line I-I shown in FIGS. 1A-1, 1C-1, 1D-1, 1G-1 and 1I-1, respectively, in accordance with some embodiments of the disclosure.

Figures 1, 1A:
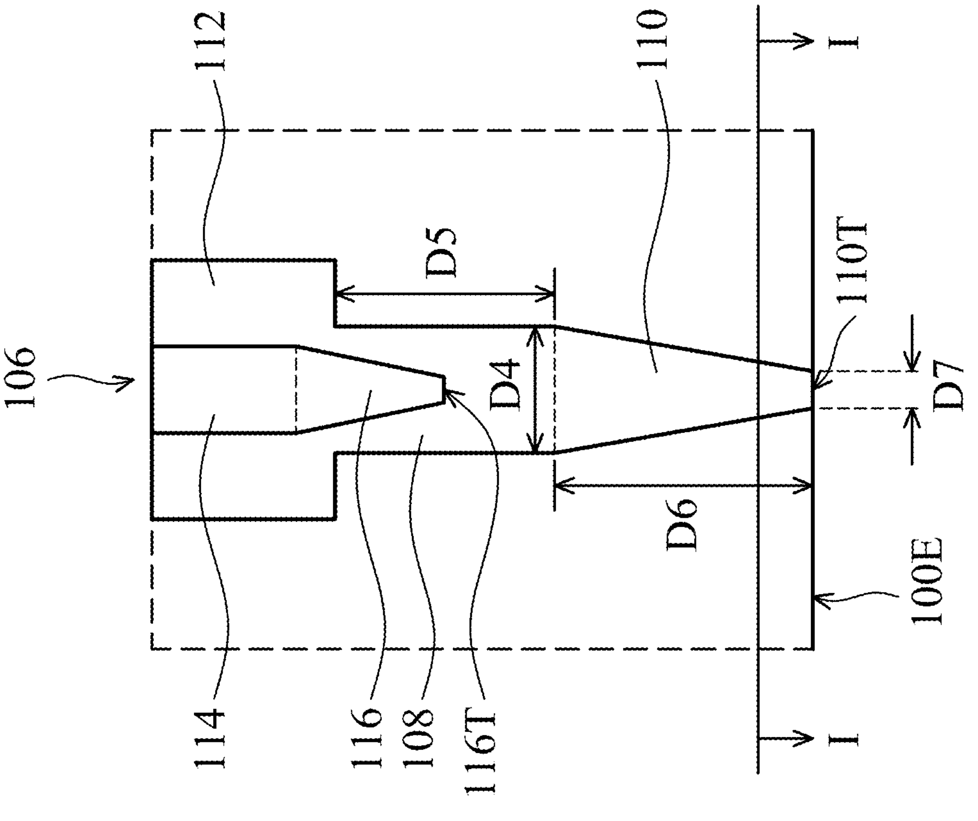
Figures 1, 1A, 2:
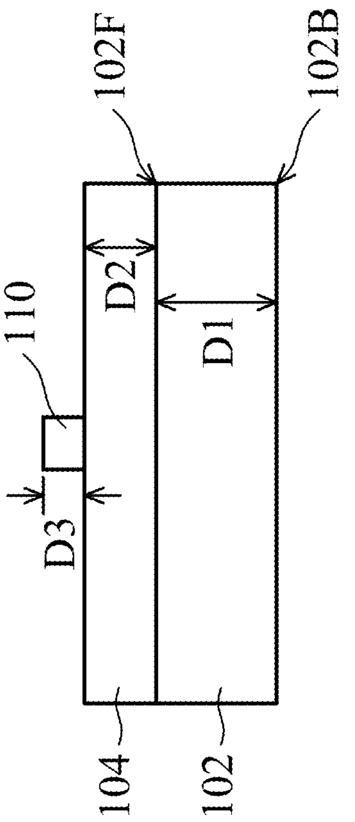

A photonic structure 100 is provided, as shown in FIGS. 1A, 1A-1 and 1A-2, in accordance with some embodiments. The photonic structure 100 is formed from a silicon-on-insulator (SOI) substrate which includes a semiconductor substrate 102 (e.g., silicon wafer or chip), a buried oxide layer 104 formed over the semiconductor substrate 102, and a silicon layer formed over the buried oxide layer 104, in accordance with some embodiments. The semiconductor substrate 102 has a frontside surface 102F over which the buried oxide layer 104 is located and a backside surface 102B opposite to the frontside surface 102F, in accordance with some embodiments.

In some embodiments, the semiconductor substrate 102 has a thickness D1 in a range from about 20 microns (μm) to about 750 μm. In some embodiments, the buried oxide layer 104 has a thickness D2 in a range from about 0.6 μm to about 2 μm. If the buried oxide layer 104 is too thick, it may increase the difficulty of CMOS (complementary-metal-oxide-semiconductor) manufacturing processes. For example, a silicon-on-insulator substrate with a significantly thick buried oxide layer may result in increasing the risk of wafer de-chucking, during etching process, for example.

The silicon layer of the silicon-on-insulator substrate is patterned, thereby forming a core layer 106 for a waveguide structure (e.g., silicon waveguide), as shown in FIGS. 1A, 1A-1 and 1A-2, in accordance with some embodiments. For example, the waveguide structure may include coupling waveguides, strip waveguides, rib waveguides, slab waveguides, device waveguides, transition waveguide, and/or a combination thereof. In some embodiments, the patterning process includes forming a patterned mask layer over the silicon layer of the silicon-on-insulator substrate and followed by etching process.

Although not shown, the photonic structure 100 may include other photonic components, e.g., optical transceivers, photodetectors, optical modulators, grating couplers, light-emitting diodes, another waveguide structure (e.g., nitride waveguide) and/or the like, which are to be coupled to the waveguide structure including core layer 106. FIGS. 1A and 1A-1 also illustrate an edge 100E of the photonic structure 100 (i.e., an edge of the semiconductor substrate 102) which is to be coupled to an external optical fiber. The edge 100E of the photonic structure 100 may be formed by an etching process and/or a cutting process.

The core layer 106 includes a first optical transmission region 108 which is used to form a strip waveguide, an optical coupling region 110 which is used to form an edge coupler (an optical mode converter), a second transmission region 112 which is used to form a slab waveguide, a third transmission region 114 which is used to form a device waveguide, and an optical transition region 116 which is used to form a transition waveguide, in accordance with some embodiments.

In some embodiments, the first optical transmission region 108 has a thickness in a range from about 200 nm to about 350 nm, a width D4 from about 370 nm to about 470 nm, and a length D5 from about 500 nm to about 20000 nm. The thickness and the width D4 of the first optical transmission region 108 may be substantially consistent along its lengthwise direction.

The optical coupling region 110 is connected to the first optical transmission region 108 and has a terminus (or end) 110T located at the edge 100E of the photonic structure 100, in accordance with some embodiments. The optical coupling region 110 between the first optical transmission region 108 and an external optical fiber is configured to contribute optical mode expansion, in accordance with some embodiments. The optical coupling region 110 is tapered (e.g., progressively narrowed and optionally thinned down) from the first transmission region 108 to the terminus 110T of the optical coupling region 110, in accordance with some embodiments. In some embodiments, a thickness D3 of the optical coupling region 110 is thinned down to a thickness of about 70 to about 130 nm as it approaches the edge 100E. In some embodiments, the width of the optical coupling region 110 is narrowed down to a width D7 of about 70 nm to about 150 nm as it approaches the edge 100E. In some embodiments, the optical coupling region 110 has a length D6 in a range from about 500 nm to about 10000 nm. Tapering of the optical coupling region 110 may improve the propagation efficiency and mode expansion, thereby matching an optical mode of an external optical fiber. It should be noted that the tapering may be continuous based on such mathematical functions as linear, sinuous, parabolic, or elliptical functions.

The second transmission region 112 is connected to the first optical transmission region 108, in accordance with some embodiments. The second transmission region 112 may be configured to couple to conductive features of another optical component (e.g., contact plugs of a photodetector). In some embodiments, the second transmission region 112 has a thickness in a range from about 200 nm to about 350 nm and a width from about 600 nm to about 1000 nm.

In some embodiments, the third transmission region 114 and the optical transition region 116 connecting to the third transmission region 114 are located over the second transmission region 112. In some embodiments, a portion of the optical transition region 116 extends above the first transmission region 108. In some embodiments, the third transmission region 114 has a thickness in a range from about 200 nm to about 350 nm and a width from about 370 nm to about 470 nm. The optical transition region 116 has a terminus (or end) 116T, in accordance with some embodiments, and is tapered (e.g., progressively narrowed and optionally thinned down) from the third transmission region 114 to the terminus 116T of the optical transition region 116, in accordance with some embodiments.

Figure 1B:
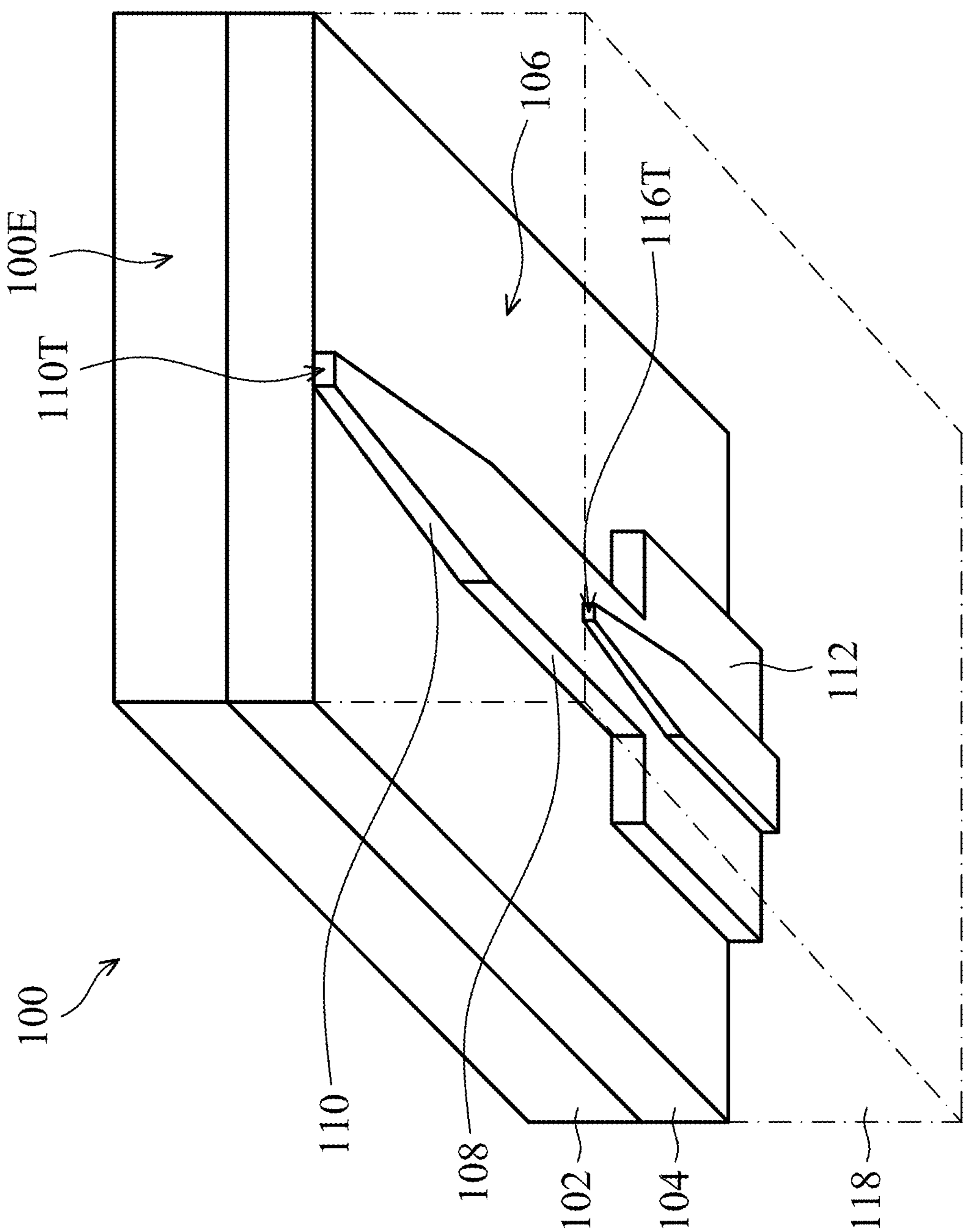

A protection layer 118 is formed over (e.g., deposited on or bonded to) the buried oxide layer 104 to cover the core layer 106 and the semiconductor substrate 102 is then flipped upside down, as shown in FIG. 1B, in accordance with some embodiments. The protection layer 118 may be a dielectric layer (such as silicon oxide, silicon nitride, silicon oxynitride, and/or a combination thereof), a molding material (such as an epoxy-based resin), or a carrier substrate (such of made, polymer, polymer composite, metal foil, ceramic, glass, glass epoxy, beryllium oxide, tape, or other suitable material for structural support), and/or another suitable material for structural support. For example, an adhesion layer (e.g., light-to-heat-conversion (LTHC) film) may be formed between the photonic structure 100 and a carrier substrate. The protection layer 118 is configured as a carrier for supporting the photonic structure 100, thereby preventing the optical components of the silicon layer (e.g., core layer 106) from damage during subsequent processes, in accordance with some embodiments.

Figure 1C:
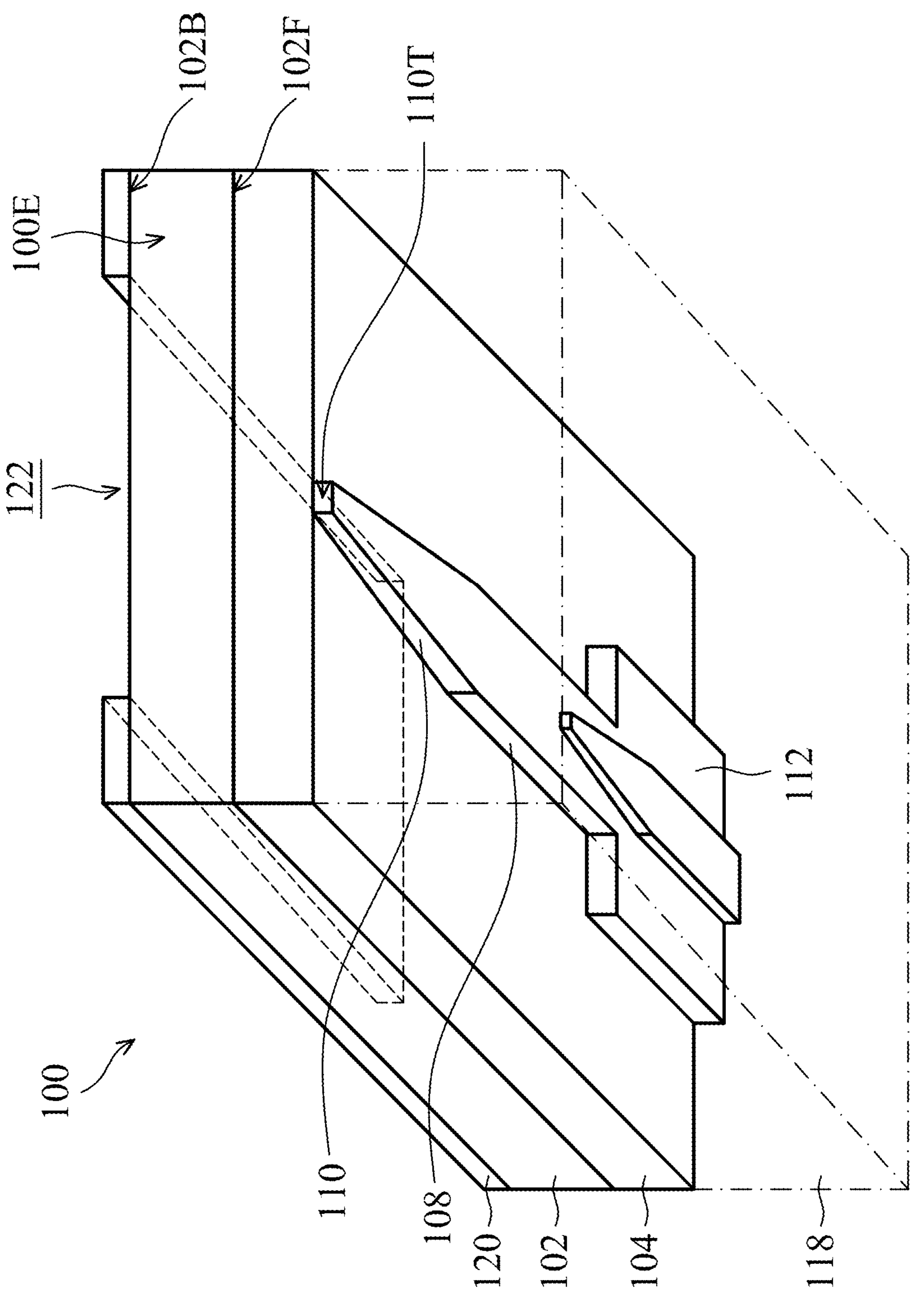
Figures 1, 1C, 2:
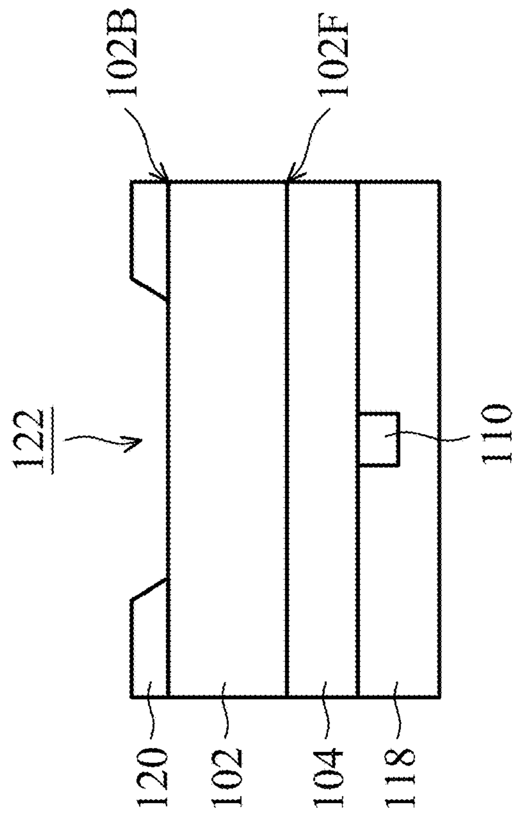
Figures 1, 1C:
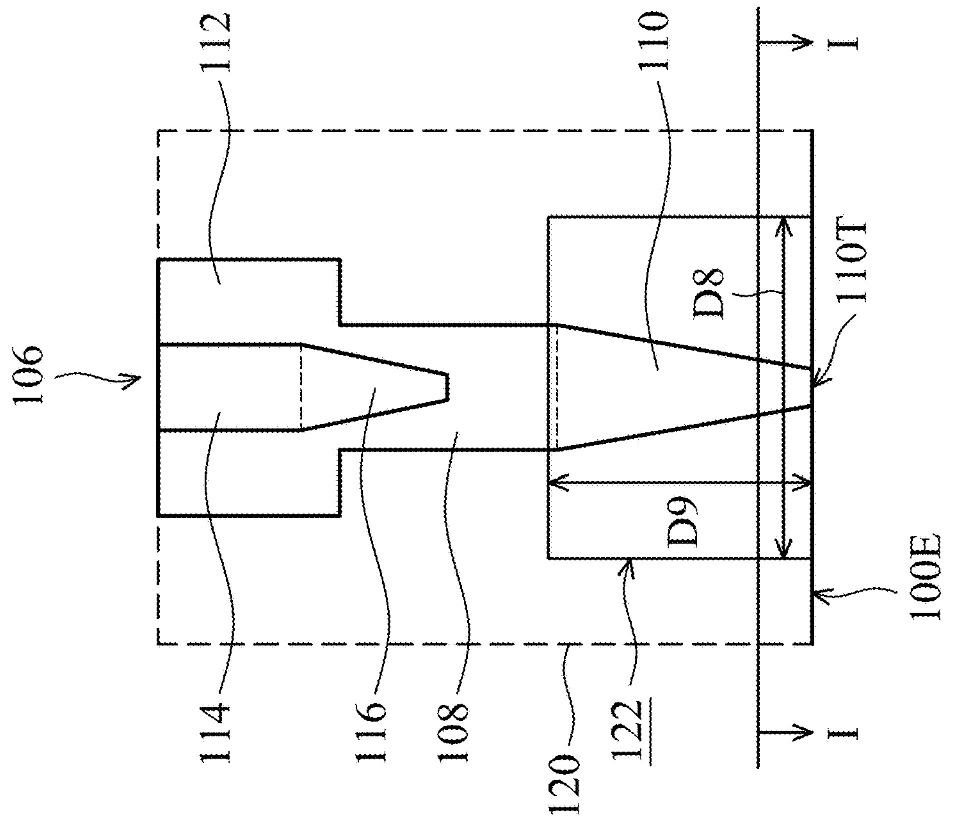

A patterned mask layer 120 is formed over the backside surface 102B of the semiconductor substrate 102, as shown in FIGS. 1C, 1C-1 and 1C-2, in accordance with some embodiments. The patterned mask layer 120 has an opening pattern 122 exposing the backside surface 102B of the semiconductor substrate 102, in accordance with some embodiments. In some embodiments, the patterned mask layer 120 is a patterned photoresist layer. For example, a photoresist may be formed over the backside surface 102B of the semiconductor substrate 102, such as by using spin-on coating, and patterned with the opening pattern 122 by exposing the photoresist to light using an appropriate photomask. Exposed or unexposed portions of the photoresist may be removed depending on whether a positive or negative resist is used. In alternative embodiments, the patterned mask layer 120 is a patterned hard mask layer which is formed by a dielectric layer (such as silicon oxide, silicon nitride, silicon oxynitride, and/or a combination thereof). The dielectric layer may be patterned by forming a patterned photoresist layer over the dielectric layer using the above-described steps and etching the dielectric layer to form the opening pattern 122.

The opening pattern 122 of the patterned mask layer 120 is aligned over the optical coupling region 110, as shown in FIGS. 1C, 1C-1 and 1C-2, in accordance with some embodiments. That is, when viewed from the plan view of FIG. 1C-1, the opening pattern 122 overlaps the optical coupling region 110, in accordance with some embodiments. The opening pattern 122 may also overlap a small portion of the first optical transmission region 108 proximate to the optical coupling region 110 but does not overlap most of the first optical transmission region 108. In some embodiments, an area of the optical coupling region 110 is substantially entirely located or confined within an area of the opening pattern 122 in the plan view of FIG. 1C-1. In some embodiments, the opening pattern 122 has a width D8 in a range from about 7 μm to about 15 μm and a length D9 in a range from 500 nm to about 12000 nm.

Figure 1D:
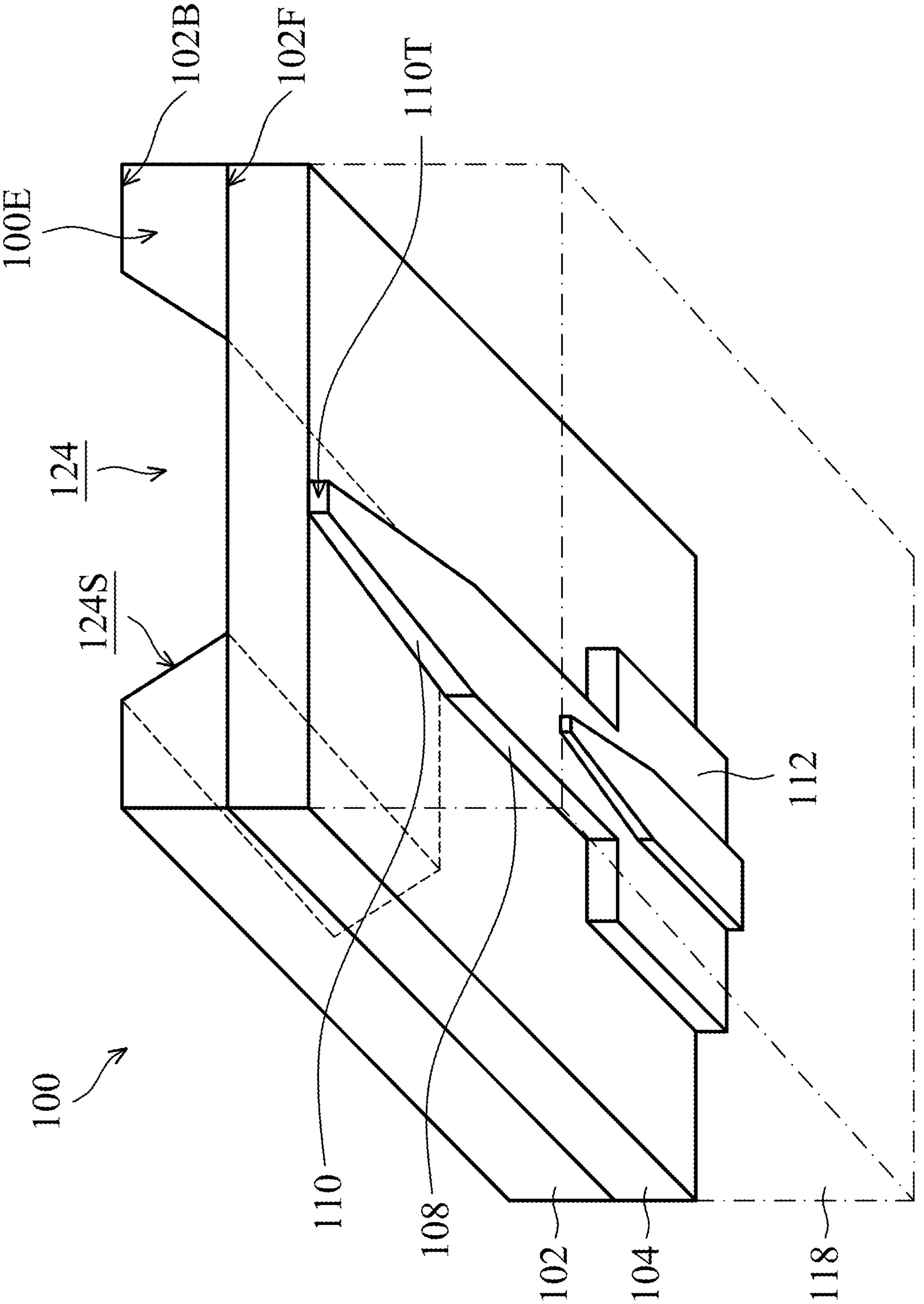
Figures 1, 1D, 2:
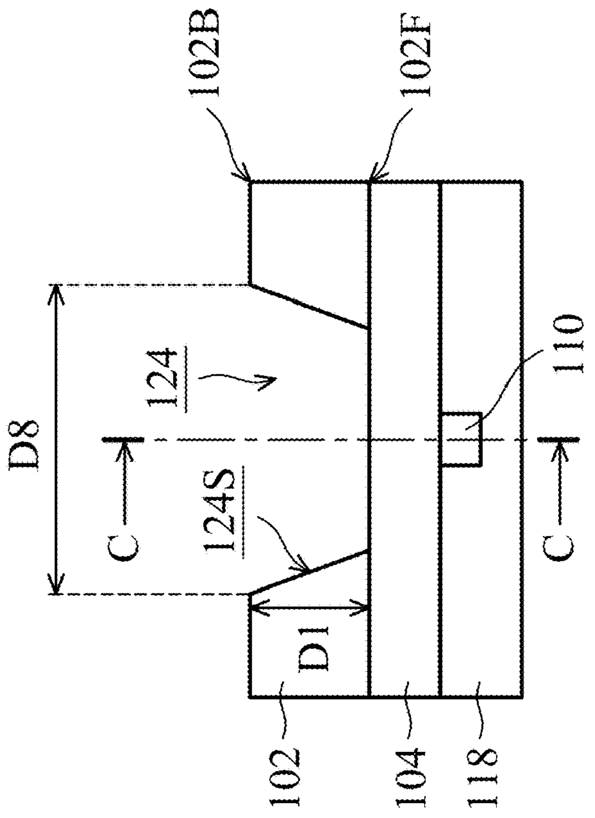
Figures 1, 1D:
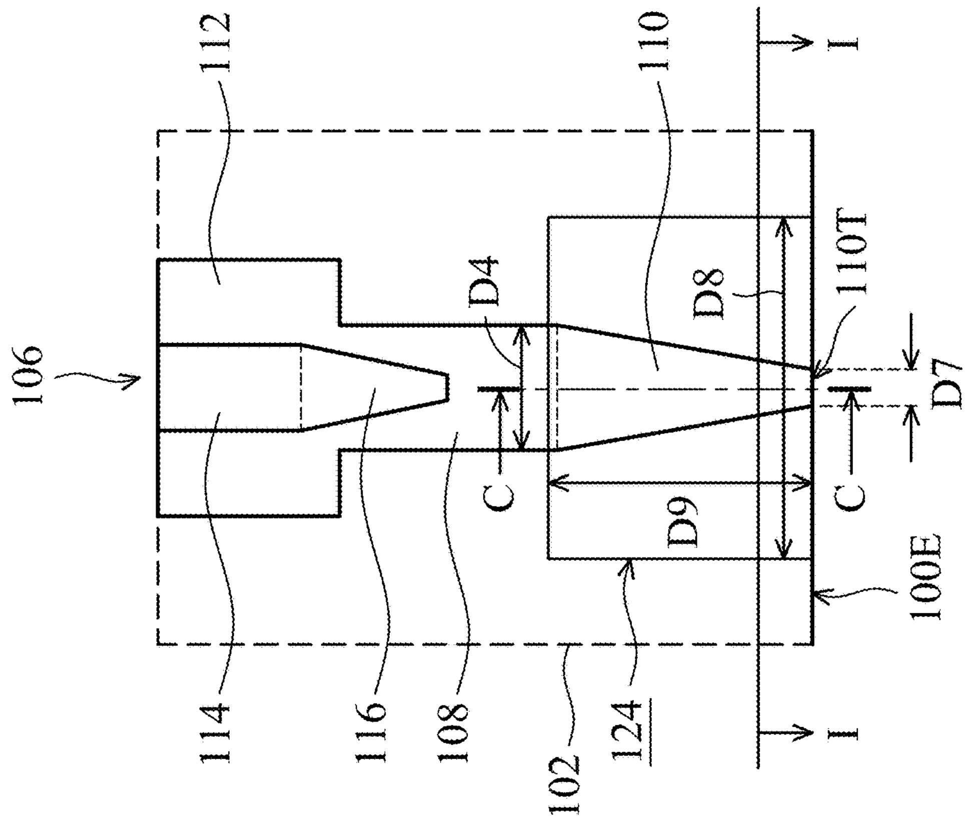

An etching process is performed on the photonic structure 100 using the patterned mask layer 120 such that a portion of the semiconductor substrate 102 exposed from the opening pattern 122 is removed until the buried oxide layer 104 is exposed, in accordance with some embodiments. The opening pattern 122 of the patterned mask layer 120 is transferred into the semiconductor substrate 102, thereby forming a trench 124 through the semiconductor substrate 102, as shown in FIGS. 1D, 1D-1 and 1D-2, in accordance with some embodiments. The etching process may be anisotropic etching process such as a dry plasma etching. For example, the dry plasma etching may use carbon fluoride gas (e.g., $CF_4$ and/or $CHF_3$) as an etchant. The patterned mask layer 120 may be removed using such as an ashing process after the etching process.

In some embodiments, the trench 124 has sidewalls 124S which are incline (e.g., tapered) toward the frontside surface 102F of the semiconductor substrate 102. The profile of the sidewalls 124S of the trench 124 may be linear. The trench 124 is aligned over the optical coupling region 110, as shown in FIGS. 1D, 1D-1 and 1D-2, in accordance with some embodiments. That is, when viewed from the plan view of FIG. 1D-1, the trench 124 may overlap the optical coupling region 110, in accordance with some embodiments. The trench 124 overlaps a small portion of the first optical transmission region 108 proximate to the optical coupling region 110 but does not overlap most of the first optical transmission region 108. In some embodiments, an area (pattern) of the optical coupling region 110 is substantially entirely located or confined within an area (pattern) of the trench 124 in the plan view of FIG. 1D-1. In the plan view, the pattern of the optical coupling region 110 and the pattern of the trench 124 may have a common central axis C-C, which is parallel with the lengthwise direction of the optical coupling region 110. The central axis C-C may virtually cut each pattern into two segments with substantially the same area.

In some embodiments, the trench 124 has a depth D1 (i.e., substantially the same as the thickness of the semiconductor substrate 102) in a range from about 20 μm to about 750 μm, a width D8 in a range from about 7 μm to about 15 μm and a length D9 in a range from about 500 nm to about 12000 nm. In some embodiments, the ratio of the width D8 to the width D7 is in a range from about 47 to about 214. In some embodiments, the ratio of the width D8 to the width D4 is in a range from about 15 to about 40.

Figure 1E:
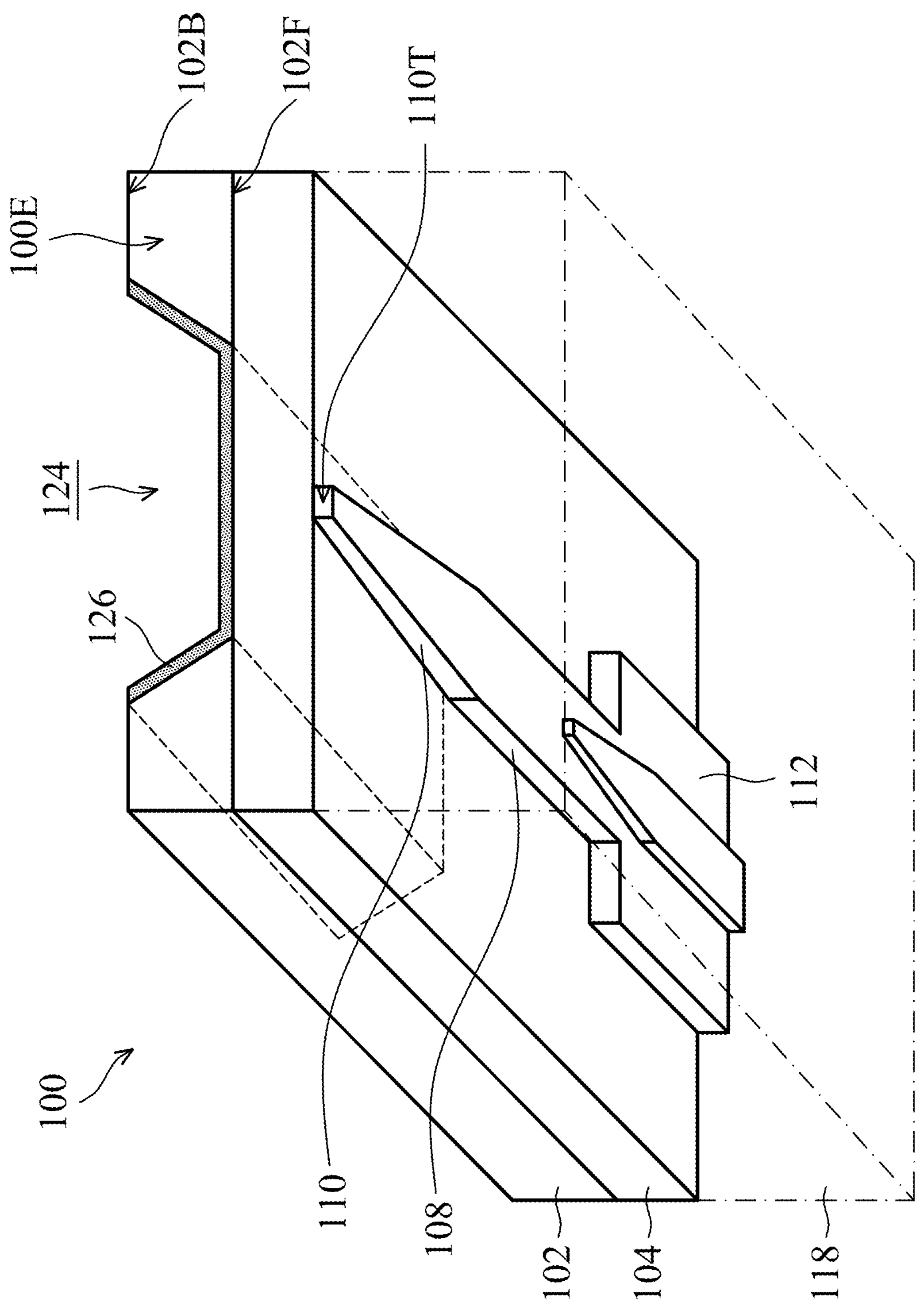

A lining oxide layer 126 is formed in the trench 124, as shown in FIG. 1E, in accordance with some embodiments. The lining oxide layer 126 is formed along the sidewalls 124S and the bottom surface of the trench 124 (i.e., the surfaces of the semiconductor substrate 102 and the buried oxide layer 104 exposed from the trench 124), in accordance with some embodiments. In some embodiments, the lining oxide layer 126 is made of silicon oxide. In some embodiments, the lining oxide layer 126 is formed using thermal oxidation process, chemical vapor deposition (CVD) process (such as low pressure CVD (LPCVD), plasma enhanced CVD (PECVD)), atomic layer deposition (ALD) process, and/or another suitable technique. In some embodiments, the lining oxide layer 126 has a thickness in a range from about 100 nm to about 1000 nm.

Figure 1F:
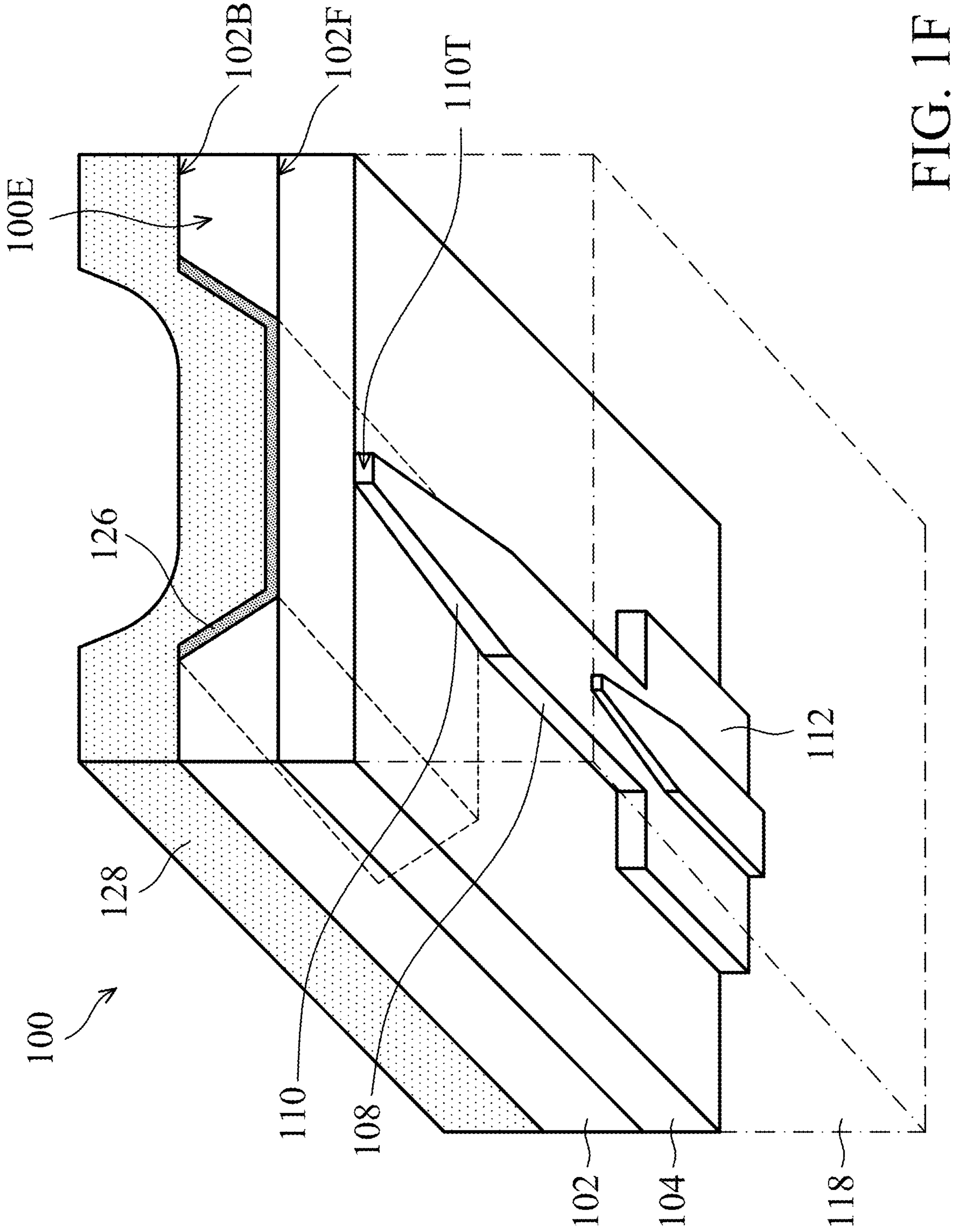

A filled oxide layer 128 is formed over the lining oxide layer 126 from the trench 124 and over the backside surface 102B of the semiconductor substrate 102, as shown in FIG. 1F, in accordance with some embodiments. The filled oxide layer 128 overfills the trench 124, in accordance with some embodiments. In some embodiments, the filled oxide layer 128 is made of silicon oxide-based material, for example, silicon oxide ($SiO_2$), silicon oxynitride (SiON), tetraethylorthosilicate (TEOS) oxide, un-doped silicate glass (USG), borophosphosilicate glass (BPSG), fluoride-doped silicate glass (FSG), phosphosilicate glass (PSG), borosilicate glass (BSG), organosilicate glass (OSG), spin-on-glass, or a combination thereof. In some embodiments, the filled oxide layer 128 is formed using spin-on coating, CVD process (such as LPCVD, PECVD, high-density plasma CVD (HDP-CVD), high aspect ratio process (HARP), and flowable CVD (FCVD)), ALD process, and/or another suitable technique.

Figure 1G:
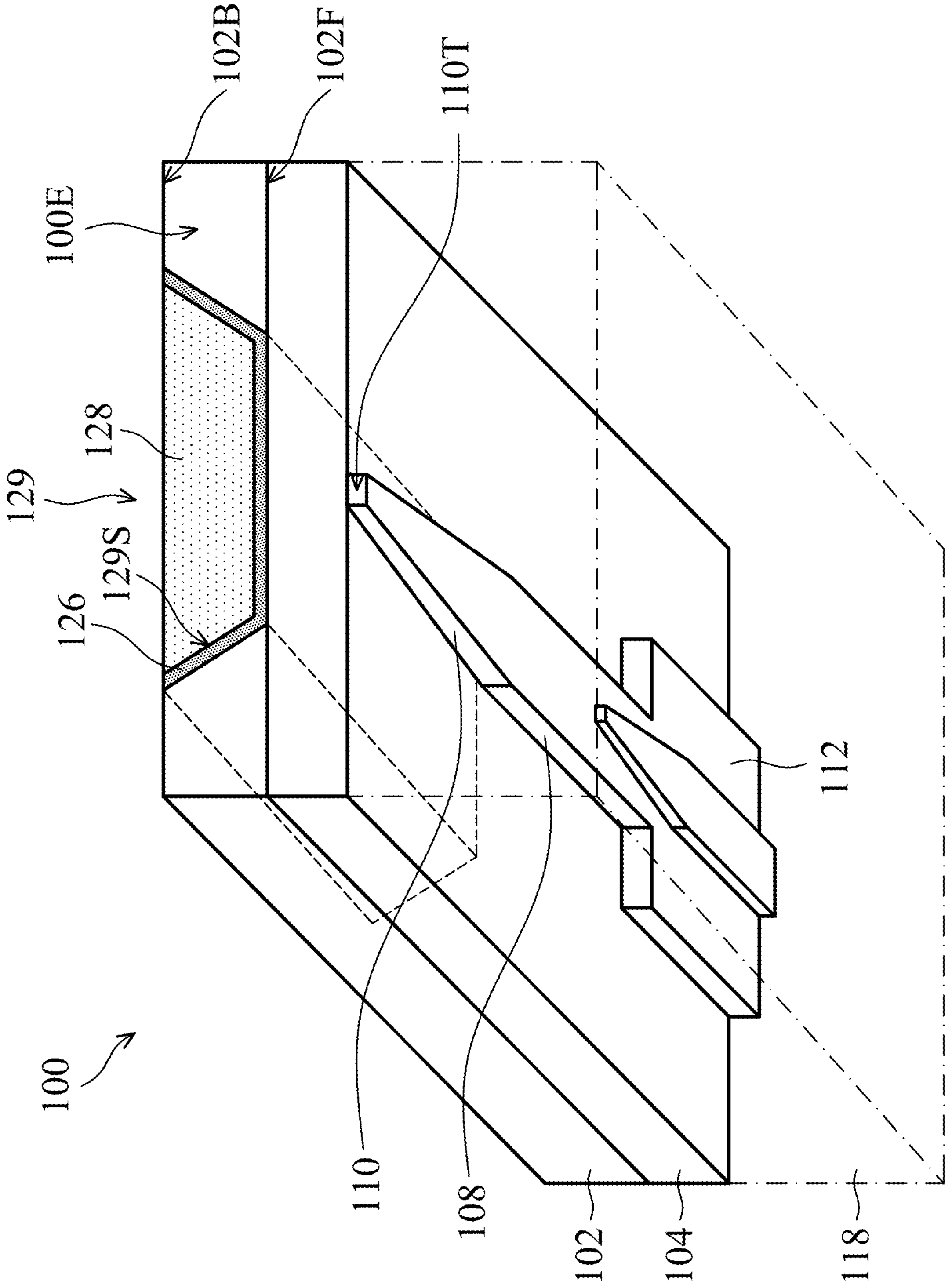
Figures 1, 1G, 2:
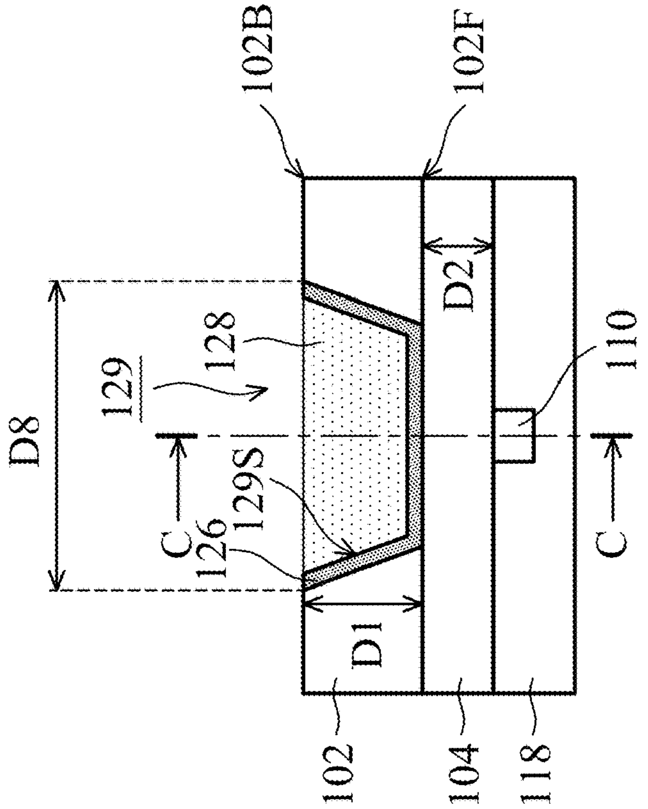
Figures 1, 1G:
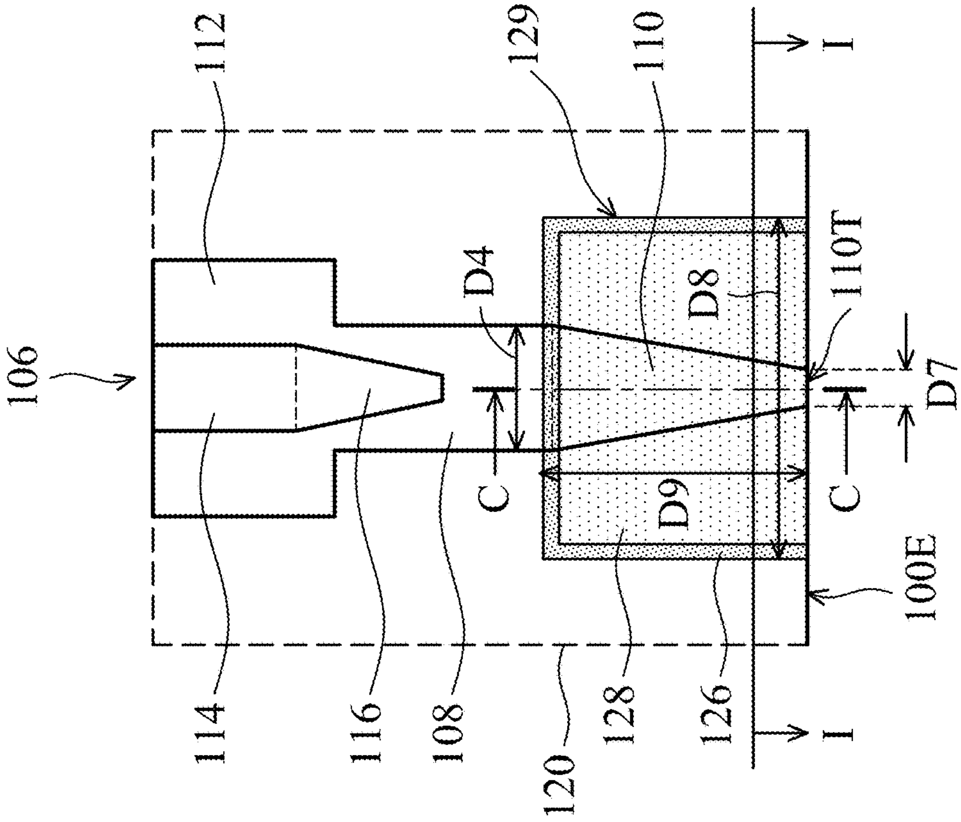

A planarization process is performed on the photonic structure 100 to remove a portion of the filled oxide layer 128 over the backside surface 102B of the semiconductor substrate 102, in accordance with some embodiments. The planarization process may be chemical mechanical polish (CMP) process or an etching-back process. The planarization process is performed until the backside surface 102B of the semiconductor substrate 102 is exposed, as shown in FIGS. 1G and 1G-2, in accordance with some embodiments. A portion of the filled oxide layer 128 remaining in the trench 124 and the lining oxide layer 126 combine to form an oxide structure 129, in accordance with some embodiments. The upper surface of the oxide structure 129 is substantially coplanar with the backside surface 102B of the semiconductor substrate 102.

The oxide structure 129 is aligned over the optical coupling region 110, as shown in FIGS. 1G, 1G-1 and 1G-2, in accordance with some embodiments. That is, when viewed from the plan view of FIG. 1G-1, the oxide structure 129 overlaps the optical coupling region 110, in accordance with some embodiments. The oxide structure 129 may overlap a small portion of the first optical transmission region 108 proximate to the optical coupling region 110 but does not overlap most of the first optical transmission region 108. In some embodiments, an area (pattern) of the optical coupling region 110 is substantially entirely located or confined within an area (pattern) of the oxide structure 129 in the plan view of FIG. 1G-1. In the plan view, the pattern of the optical coupling region 110 and the pattern of the oxide structure 129 may have the common central axis C-C.

In some embodiments, the oxide structure 129 has a thickness D1 (i.e., substantially the same as the thickness of the semiconductor substrate 102) in a range from about 20 μm to about 750 μm. In some embodiments, the oxide structure 129 is thicker than the buried oxide layer 104. In some embodiments, the ratio of the thickness D1 of the oxide structure 129 to the width D2 (FIG. 1A-2) of the buried oxide layer 104 is in a range from about 10 to about 1250. If the ratio is too small, a light mode expanding through the optical coupling region 110 may exceed to the oxide structure 129, thereby incurring an optical signal loss.

In some embodiments, the oxide structure 129 has a width D8 in a range from about 7 μm to about 15 μm and a length D9 in a range from about 500 nm to about 12000 nm. In some embodiments, the ratio of the width D8 of the oxide structure 129 to the width D7 of the terminus 110T of the optical coupling region 110 is in a range from about 47 to about 214. In some embodiments, the ratio of the width D8 of the oxide structure 129 to the width D4 of the optical transmission region 108 is in a range from about 15 to about 40. If the width D8 of the oxide structure 129 is too small (or the ratios are too small), a light mode expanding through the optical coupling region 110 may exceed to the oxide structure 129, thereby incurring an optical signal loss. If the width D8 of the oxide structure 129 is too large (or the ratios are too large), it may increase the difficulty and cost of the processes for forming the oxide structure 129.

Figure 1H:
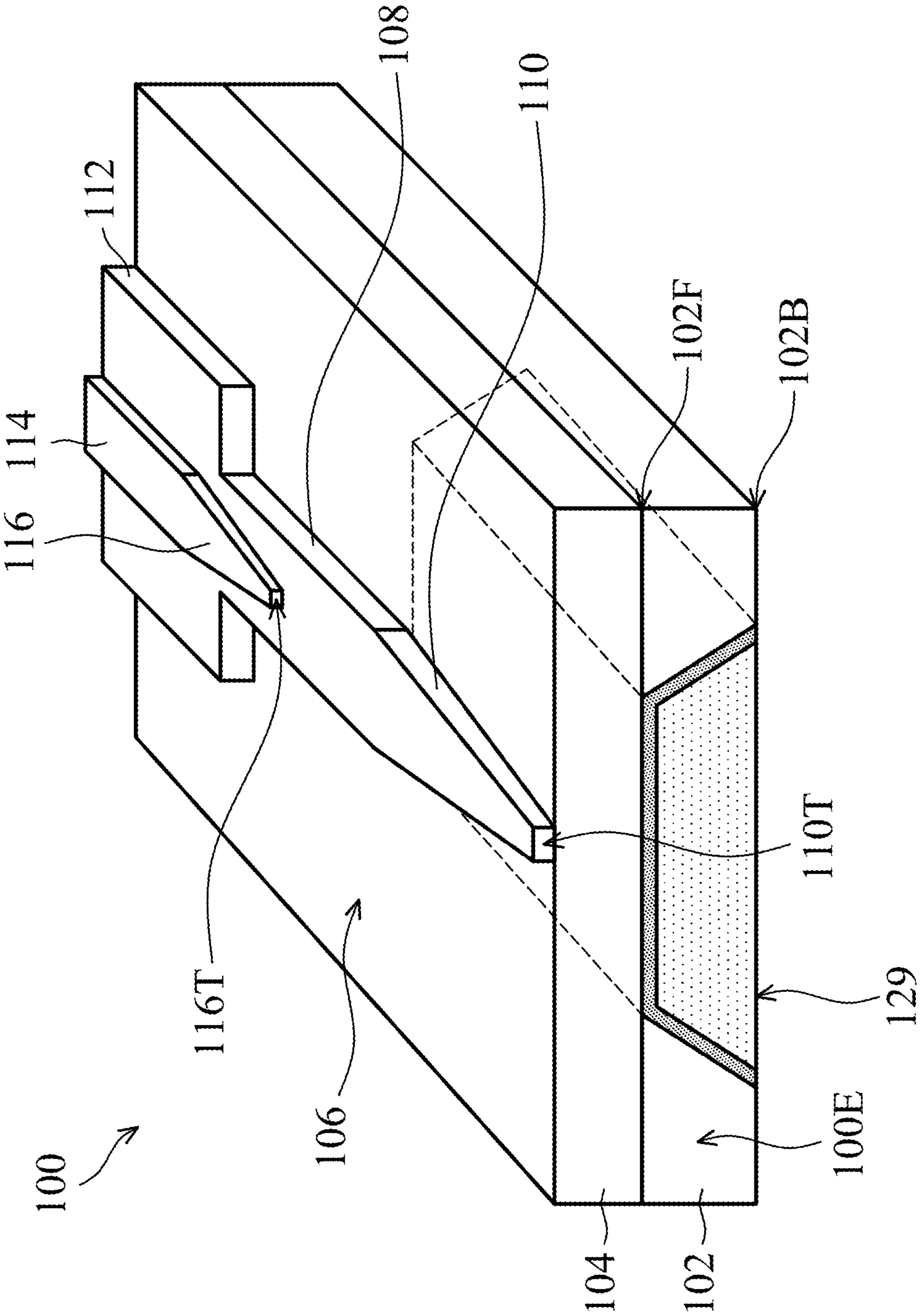

After the planarization process, the semiconductor substrate 102 is flipped upside down and the protection layer 118 is then removed, thereby exposing the core layer 106 and the buried oxide layer 104, as shown in FIG. 1H, in accordance with some embodiments. The removal process may be a wet etching process, a wet strip process or de-bonding process such as mechanical peel off. For example, the protection layer 118 may be de-bonded by exposing the protection layer 118 to a laser or UV light. The laser or UV light may break the chemical bonds of an adhesive layer between the photonic structure 100 and the protection layer 118, and the protection layer 118 may then be easily detached.

Figure 1I:
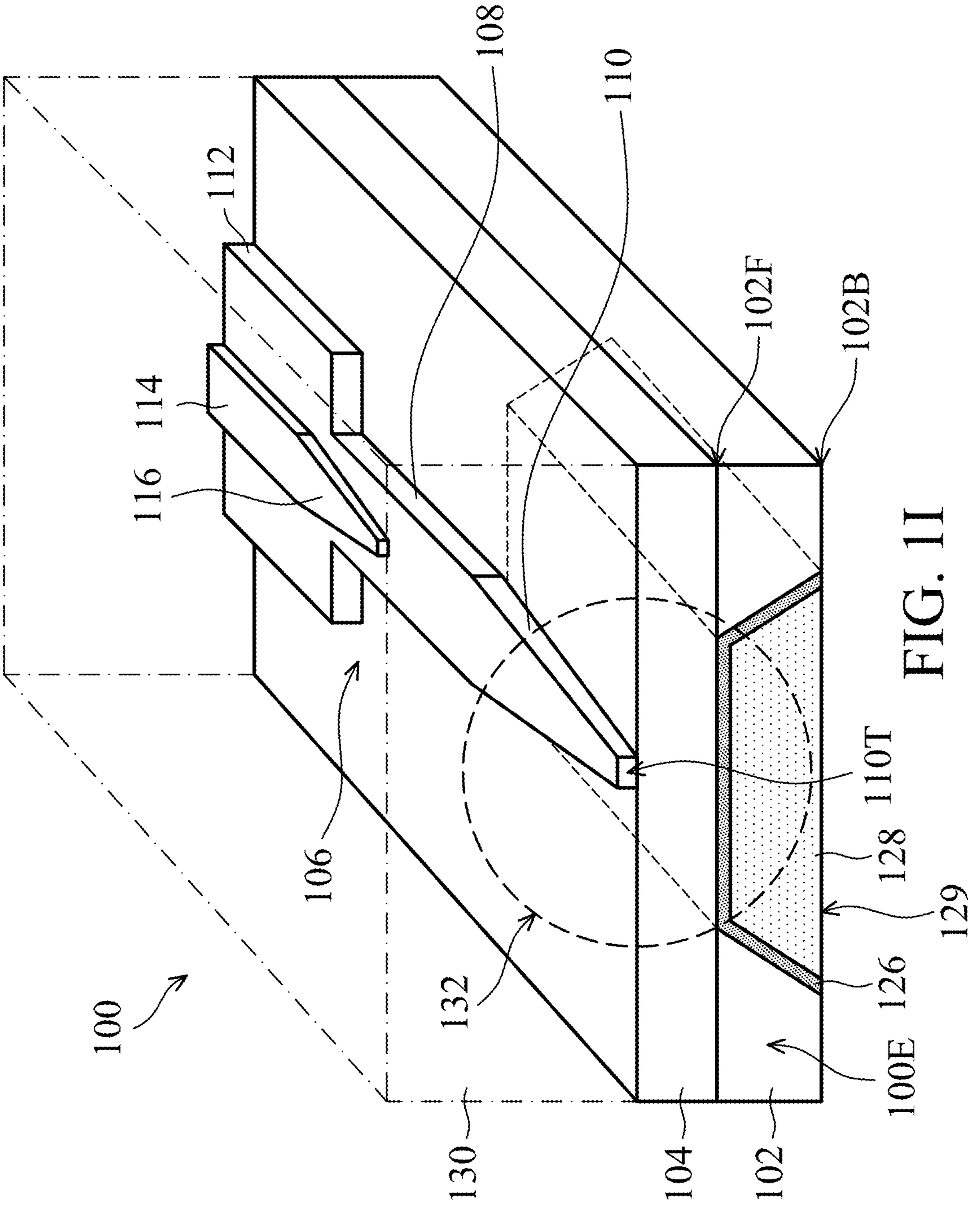
Figures 1, 1I, 2:
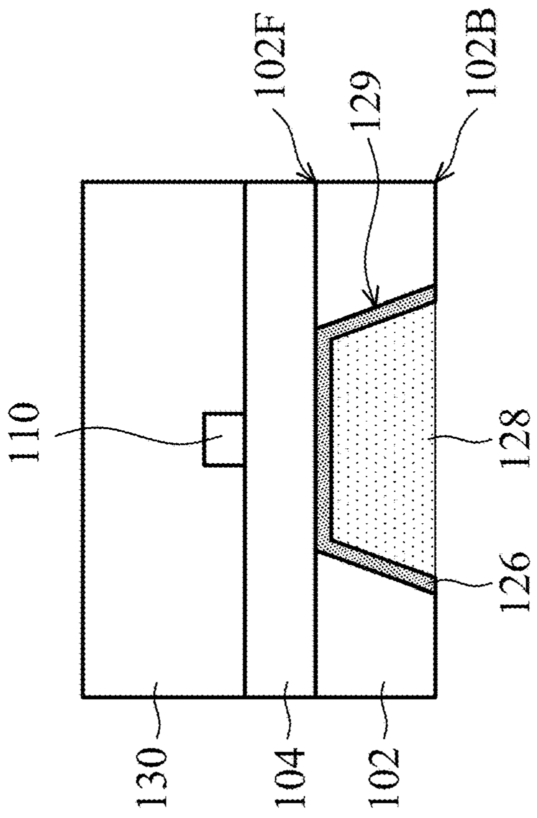
Figures 1, 1I:
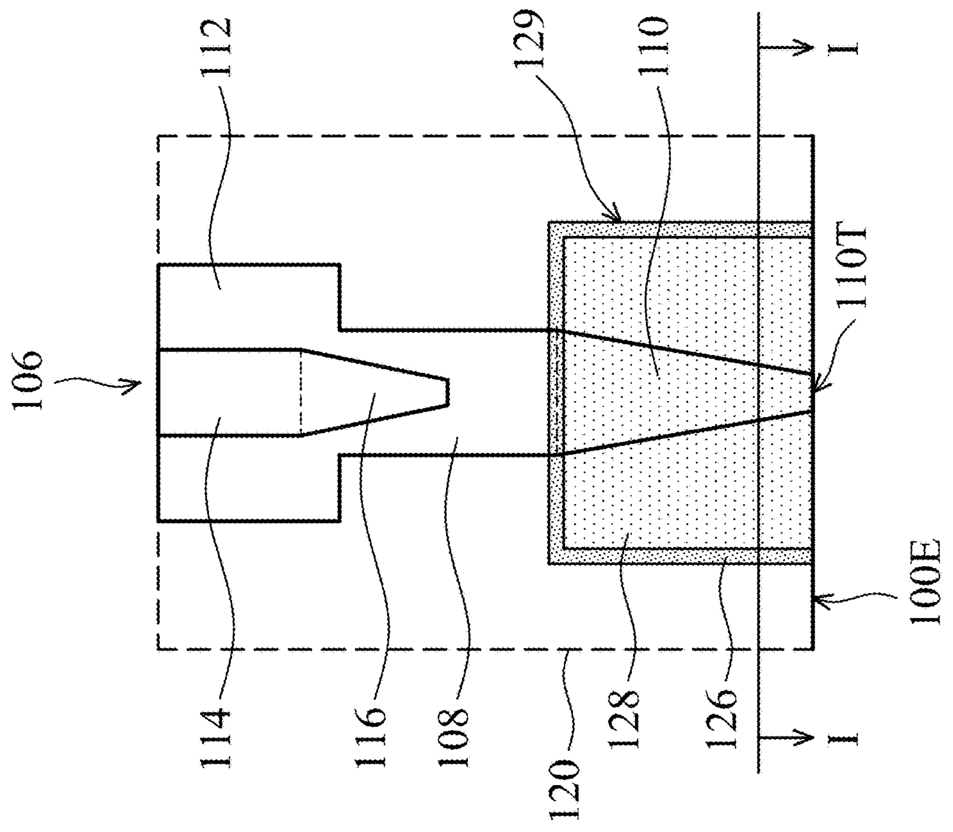

CMOS BEOL (back end of line) processes are performed on the photonic structure 100, in accordance with some embodiments. For example, a multilayer interconnect (MLI) structure may be formed over the buried oxide layer 104 over the frontside surface 102F of the semiconductor substrate 102, in accordance with some embodiments. In some embodiments, the multilayer interconnect structure includes a combination of intermetal dielectric (IMD) layer 130 (as shown in FIGS. 1I and 1I-2) and electrically conductive features (not shown, for example, contact plugs, conductive vias and/or metal lines) in the intermetal dielectric layer 130, thereby electrically coupling various optical components formed on the semiconductor substrate 102, in accordance with some embodiments.

In some embodiments, the intermetal dielectric layer 130 is a multilayer structure and mainly made of low-k dielectric material, e.g., silicon-oxide based material, such as silicon oxide ($SiO_2$), silicon oxynitride (SiON), TEOS oxide, USG, BPSG, FSG, PSG, BSG, OSG, spin-on-glass, or a combination thereof. In some embodiments, the intermetal dielectric layer 130 is deposited over the buried oxide layer 104 and the core layer 106 using CVD (such as LPCVD, PECVD, HDP-CVD, HARP, and FCVD), ALD, spin-on coating, another suitable method, or a combination thereof. The intermetal dielectric layer 130 may also include etching stop layers having different etching selectivity than silicon-oxide based material, e.g., silicon carbide, silicon nitride, etc.

After the intermetal dielectric layer 130 is formed, a waveguide structure is produced, in accordance with some embodiments. The waveguide structure includes the silicon core layer 106 and an oxide cladding layer surrounding the core layer 106 and provided by portions of the intermetal dielectric layer 130, the buried oxide layer 104 and the oxide structure 129 around the silicon core layer 106, in accordance with some embodiments.

Specifically, the first optical transmission region 108 is used as a strip waveguide; the optical coupling region 110 is used as an edge coupler (a optical mode converter); the second transmission region 112 is used as a slab waveguide; the third transmission region 114 is used as a device waveguide, and the optical transition region 116 is used as a transition waveguide, in accordance with some embodiments. Optical signals from other optical components of the photonic structure 100 and/or from an external device may be confined and transmit in the core layer 106 of the waveguide structure by a total internal reflection.

The edge coupler of the photonic structure 100 provides optical coupling between the photonic structure 100 and an external optical fiber 132 (shown in FIG. 1I) close to the edge 100E, in accordance with some embodiments. The edge coupler includes the optical coupling region 110 of the core layer 106 and a cladding layer provided by the oxide structure 129 and portions of the intermetal dielectric layer 130 and the buried oxide layer 104 around the optical coupling region 110, in accordance with some embodiments. The tapered optical coupling region 110 may contribute to optical mode expansion to match the optical mode of the external optical fiber 132 (e.g., about 7-9 μm).

The oxide structure 129 used as the cladding layer extends vertically from the frontside surface 102F to the backside surface 102B of the semiconductor substrate 102, in accordance with some embodiments. In some embodiments, the bottom surface of the oxide structure 129 is substantially coplanar with the backside surface 102B of the semiconductor substrate 102. The oxide structure 129 is aligned below the tapered optical coupling region 110 and laterally extends from the first optical transition region 108 to the edge 100E of the photonic structure 100, in accordance with some embodiments. In some embodiments, an area (pattern) of the optical coupling region 110 is substantially entirely located or confined within an area (pattern) of the oxide structure 129 in the plan view of FIG. 1I-1. A side surface of the oxide structure 129 is exposed from the edge 100E, in accordance with some embodiments. The oxide structure 129 is tapered toward the buried oxide layer 104, in accordance with some embodiments.

If the optical mode expanding through the tapered optical coupling region exceeds the buried oxide layer 104, the optical signals may escape to the semiconductor substrate, thereby incurring an optical signal loss. According to the embodiments of the present disclosure, because the cladding layer of the edge coupler includes the oxide structure 129 which passes through the semiconductor substrate 102 directly below the optical coupling region 110, the optical signals expanding through the optical coupling region 110 can be prevented from escaping to the semiconductor substrate 102 when the photonic structure 100 is coupled to the optical fiber 132, thereby reducing the optical signal loss of mode conversion.

Furthermore, the embodiments of the present disclosure utilizes the oxide structure 129 as a portion of the cladding layer so that the silicon-on-insulator substrate with a thin buried oxide layer (e.g., less than about 2 μm) can be used to form a photonic structure thereon. As a result, the process stability may be improved, e.g., reducing the risk of wafer de-chucking, thereby improving the manufacturing yield of the resulting PIC chip.

Figure 2A:
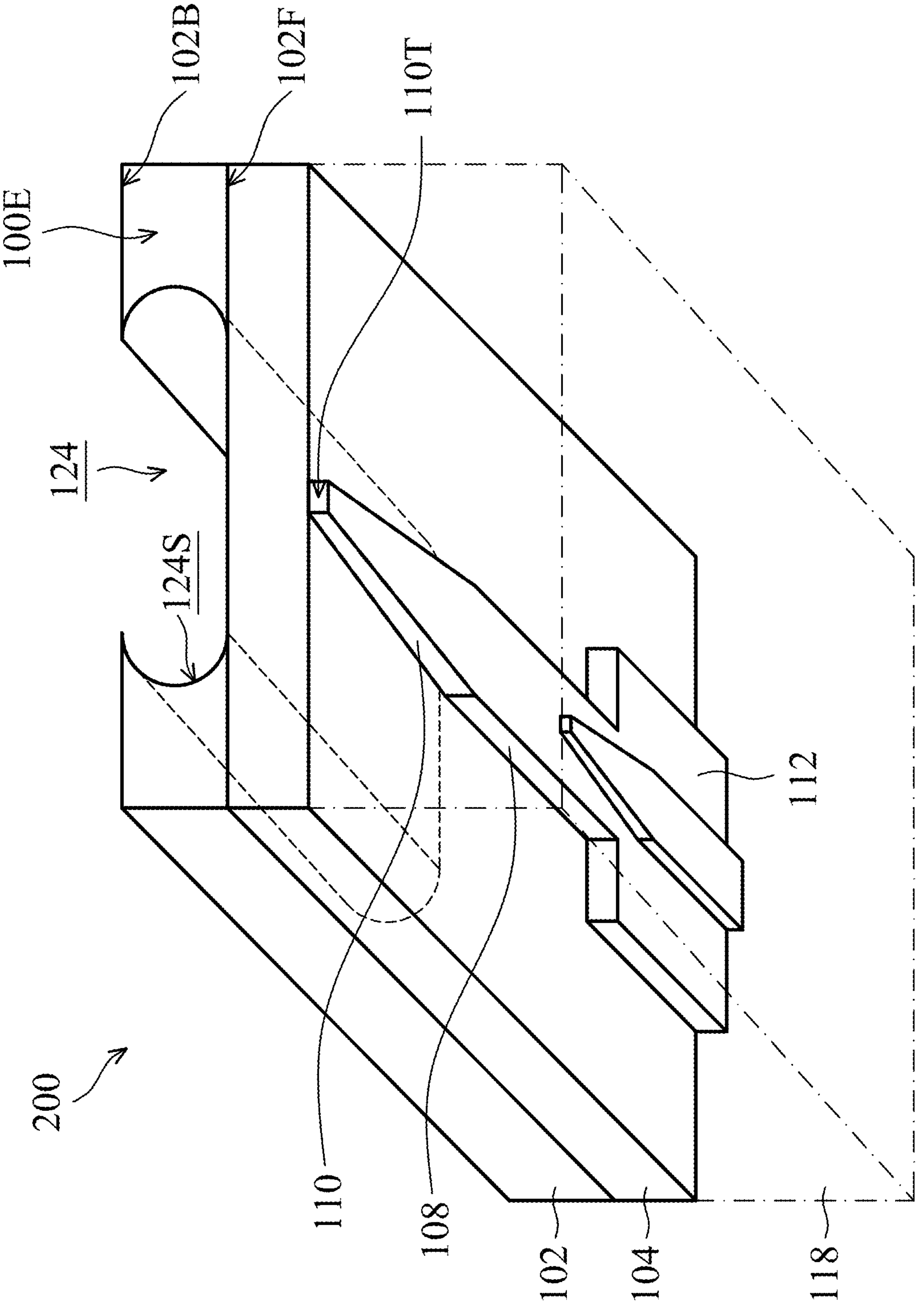
FIGS. 2A through 2C are perspective views illustrating the formation of a photonic structure at various intermediate stages, in accordance with some embodiments of the disclosure.
Figure 2B:
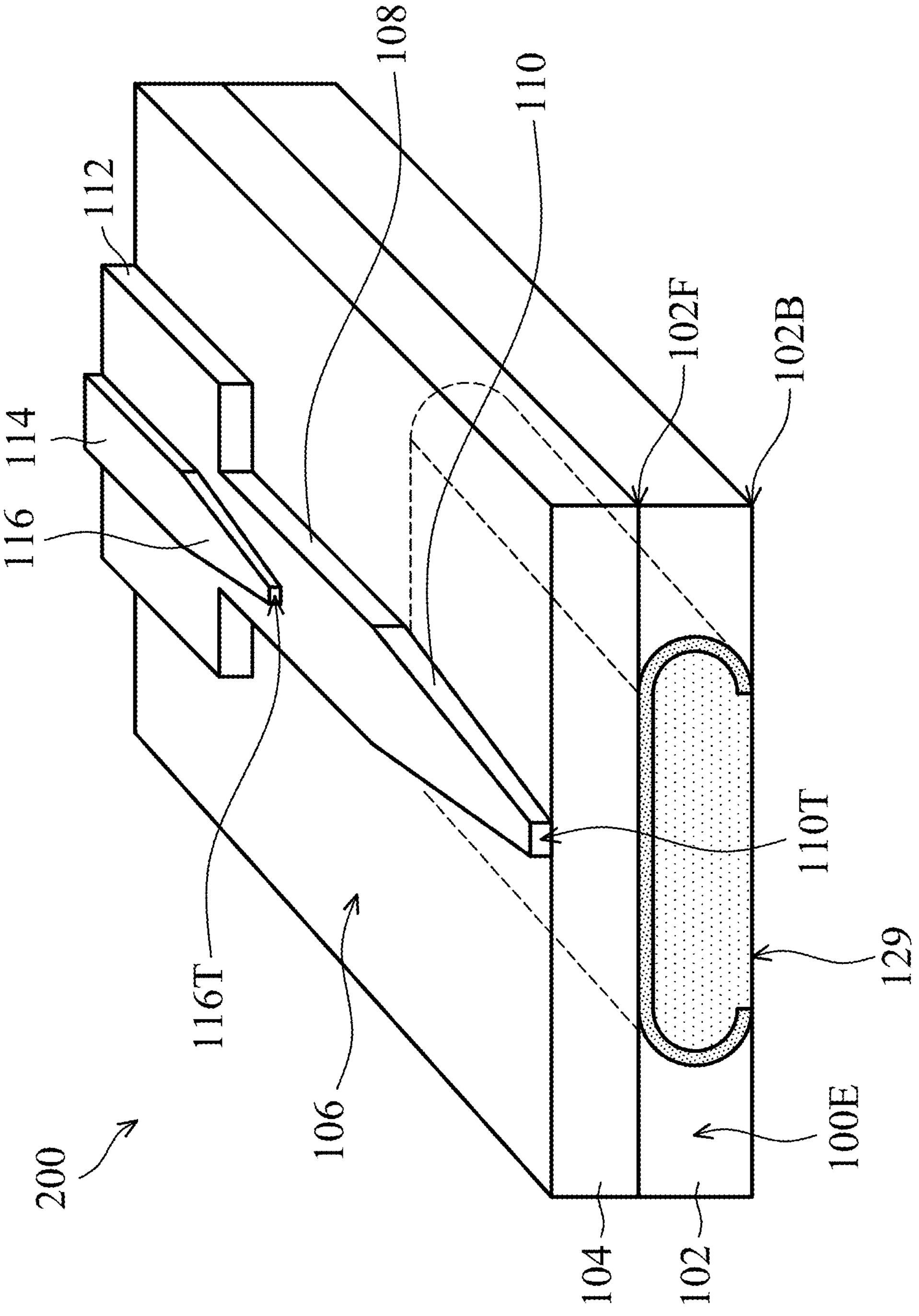
Figure 2C:
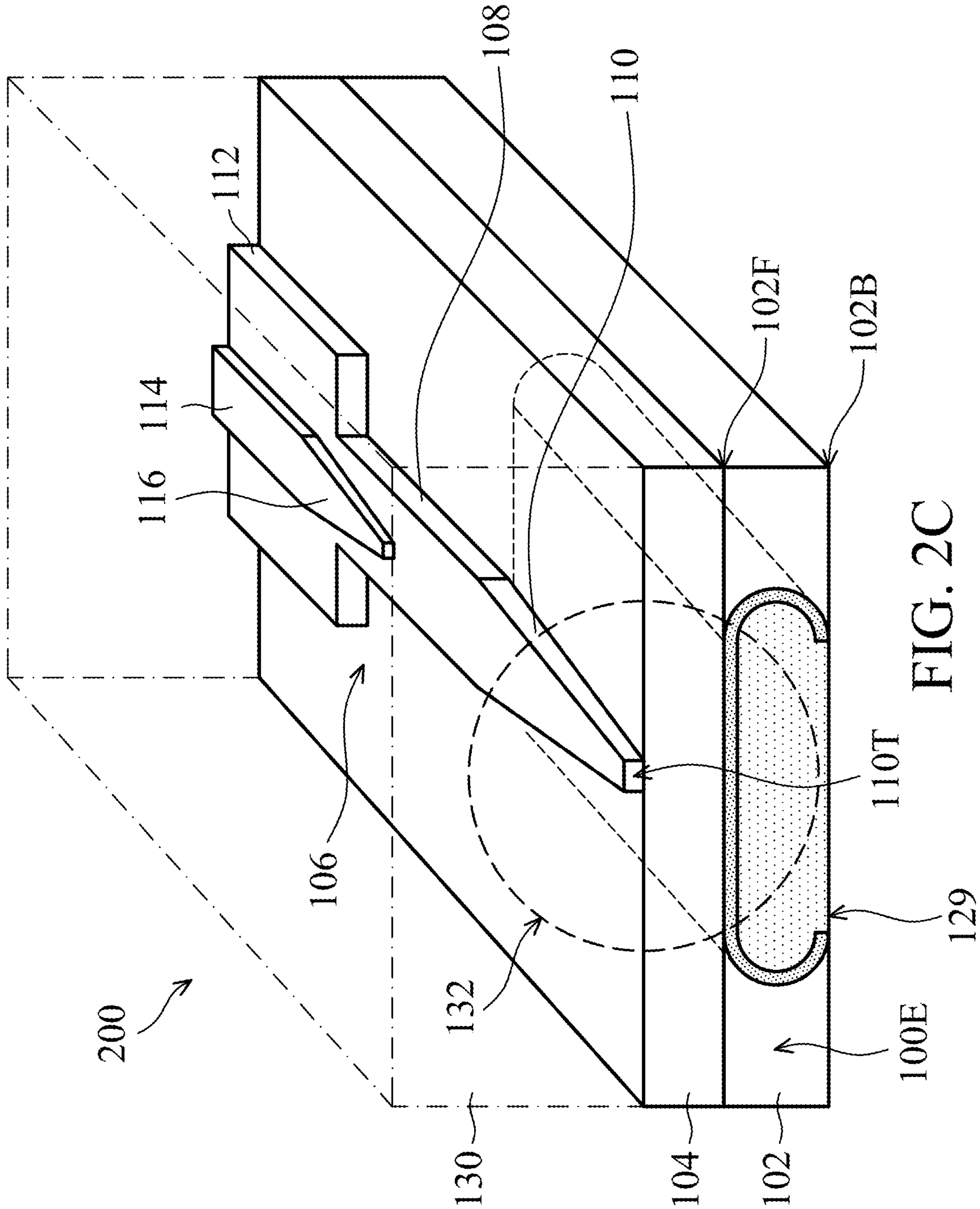

FIGS. 2A through 2C are perspective views illustrating the formation of a photonic structure at various intermediate stages, in accordance with some embodiments of the disclosure. FIGS. 2A though 2C illustrate a photonic structure 200 which is formed by the similar steps described above with respect to FIGS. 1A through 1I except for the etching process of forming the trench 124.

Continuing from FIG. 1C, an etching process is performed on the photonic structure 200 using the patterned photomask layer 120 (not shown), thereby forming a trench 124 through the semiconductor substrate 102, as shown in FIG. 2A, in accordance with some embodiments. The etching process may be an isotropic etching process such as a wet chemical etching. For example, the wet chemical etching may use dilute hydrofluoric (dHf) acid as an etchant. The profile of the sidewalls 124S of the trench 124 may be curved, e.g., convex.

The steps described above with respect to FIGS. 1E-1H are performed on the photonic structure 200, thereby forming an oxide structure 129 through the semiconductor substrate 102, as shown in FIG. 2B, in accordance with some embodiments. The profile of the sidewalls of the oxide structure 129 may be curved, e.g., convex. The step as described above with respect to FIG. 1I is performed on the photonic structure 200, thereby producing a waveguide structure, as shown in FIG. 2C, in accordance with some embodiments. Because the cladding layer of the edge coupler includes the oxide structure 129 directly below the optical coupling region 110, the optical signals expanding through the optical coupling region 110 can be prevented from escaping to the semiconductor substrate 102 when the photonic structure 100 is coupled to the optical fiber 132, thereby reducing the optical signal loss of mode conversion.

Although the embodiments of FIGS. 1A through 1I provide a method including forming a trench for an oxide structure from the backside of the semiconductor substrate, the trench may also be formed from the frontside of the semiconductor substrate. This is described in detail below.

FIGS. 3A through 3I are perspective views illustrating the formation of a photonic structure at various intermediate stages, in accordance with some embodiments of the disclosure. FIGS. 3A-1, 3B, 3C-1, 3D-1, 3G-1 and 3I-1 are plan views of the photonic structure of FIGS. 3A, 3B, 3C, 3D, 3G and 3I, respectively, in accordance with some embodiments of the disclosure. FIGS. 3A-2, 3B-2, 3C-2, 3D-2, 3G-2 and 3I-2 are cross-sectional views taken along line I-I shown in FIGS. 3A-1, 3B, 3C-1, 3D-1, 3G-1 and 3I-1, respectively, in accordance with some embodiments of the disclosure.

Figure 3A:
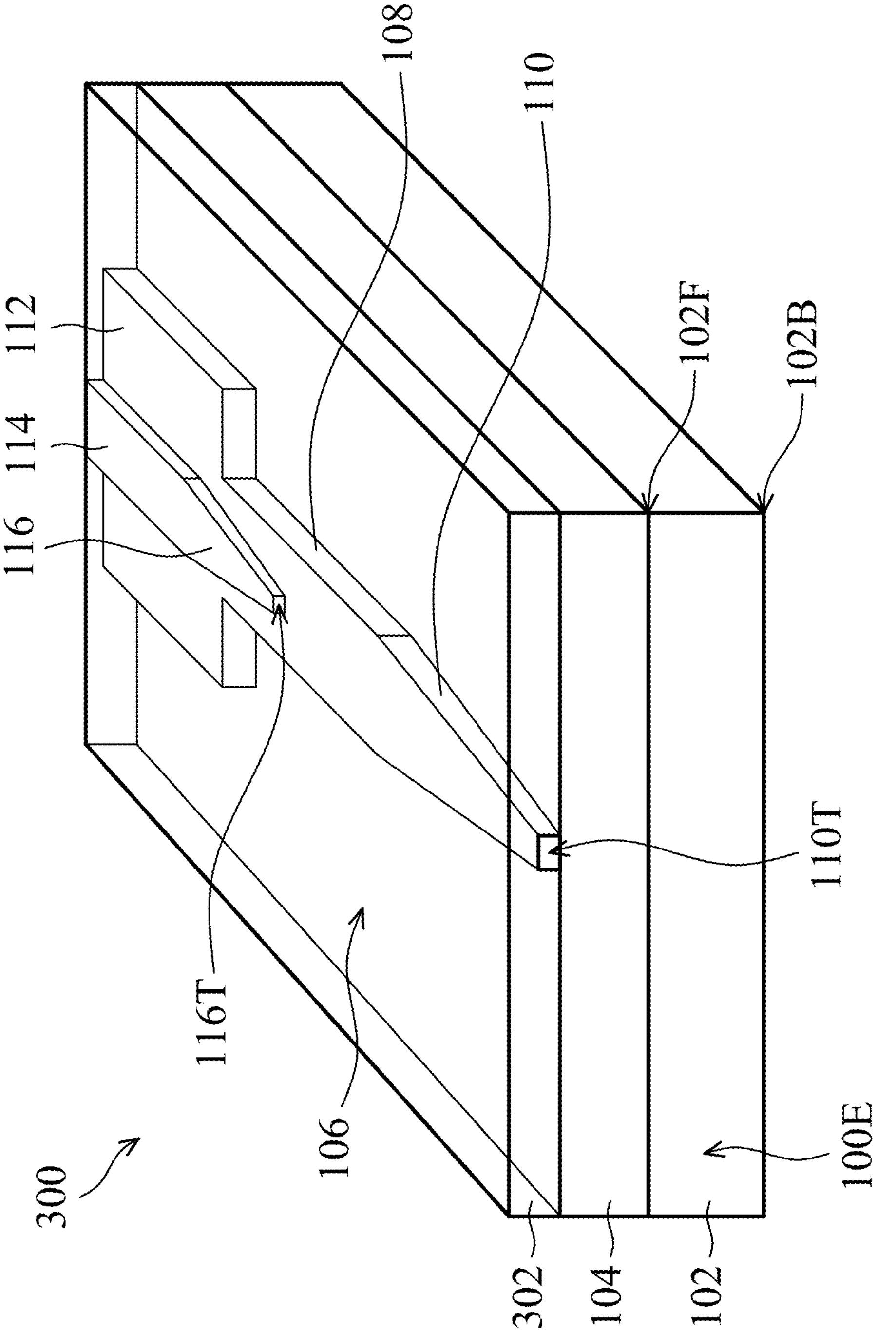
FIGS. 3A through 3I are perspective views illustrating the formation of a photonic structure at various intermediate stages, in accordance with some embodiments of the disclosure.
Figures 1, 3A:
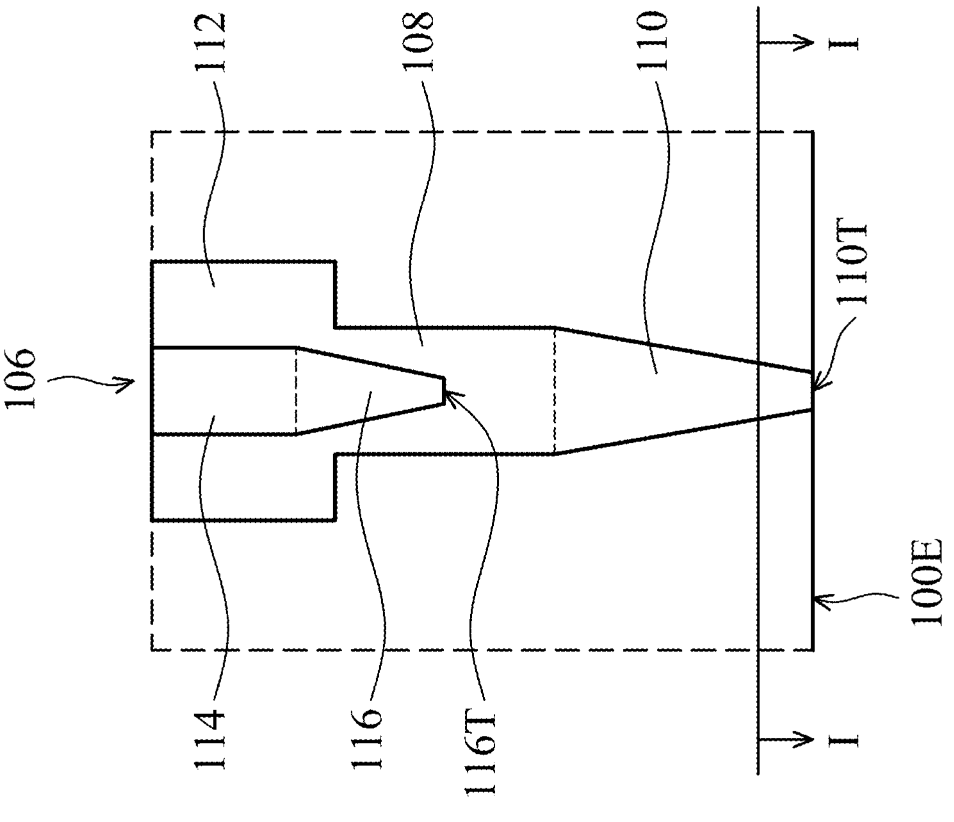
Figures 2, 3A:
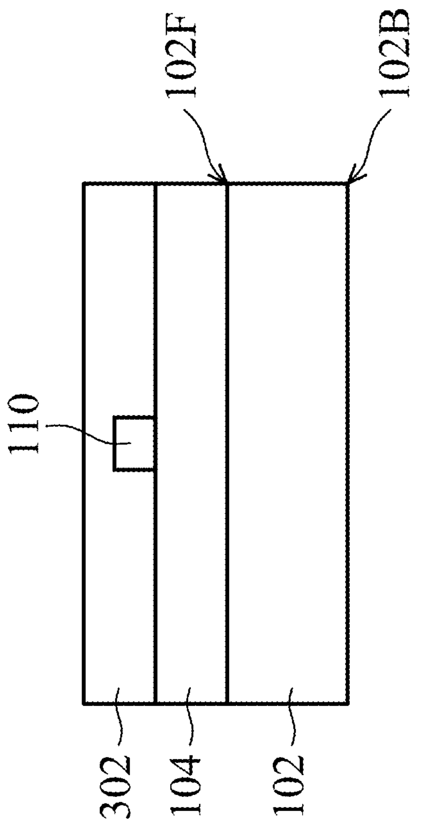

A photonic structure 300 is provided, as shown in FIGS. 3A, 3A-1 and 3A-2, in accordance with some embodiments. The photonic structure 300 may be similar to the photonic structure 100 of FIGS. 1A, 1A-1 and 1A-2. A capping layer 302 is formed over the upper surface of the buried oxide layer 104, thereby covering the core layer 106, in accordance with some embodiments. The capping layer 302 is configured as a planarization layer for a photoresist layer subsequently formed thereon, in accordance with some embodiments.

In some embodiments, the capping layer 302 is made of silicon oxide. In alternative embodiments, the capping layer 302 is made of another dielectric material such as silicon nitride, silicon oxynitride, silicon carbide and the like. In some embodiments, the capping layer 302 is formed using a deposition process followed by a planarization process. The deposition process may be spin-on coating, CVD process (such as LPCVD, PECVD), ALD process, and/or another suitable technique. The planarization process may be CMP.

Figure 3B:
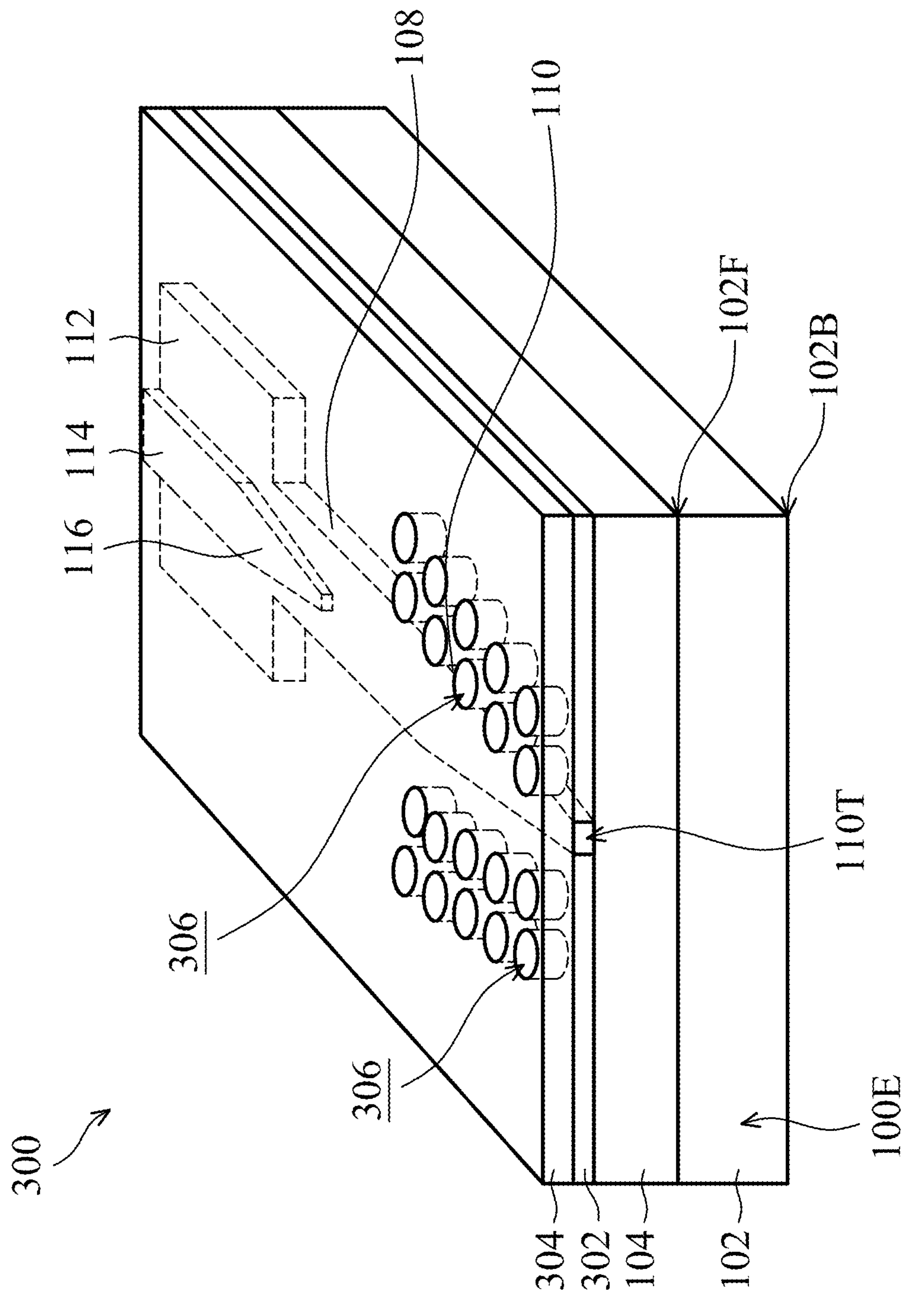
Figures 2, 3B:
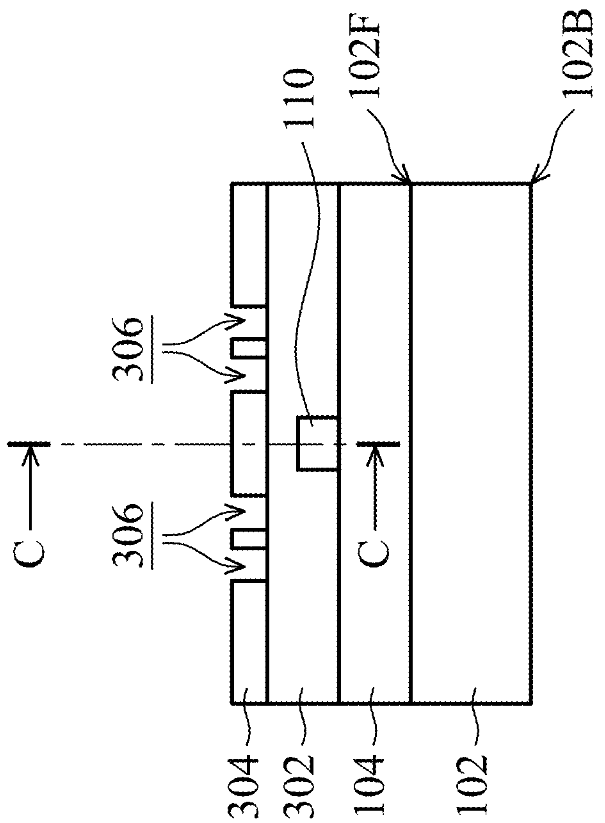
Figures 1, 3B:
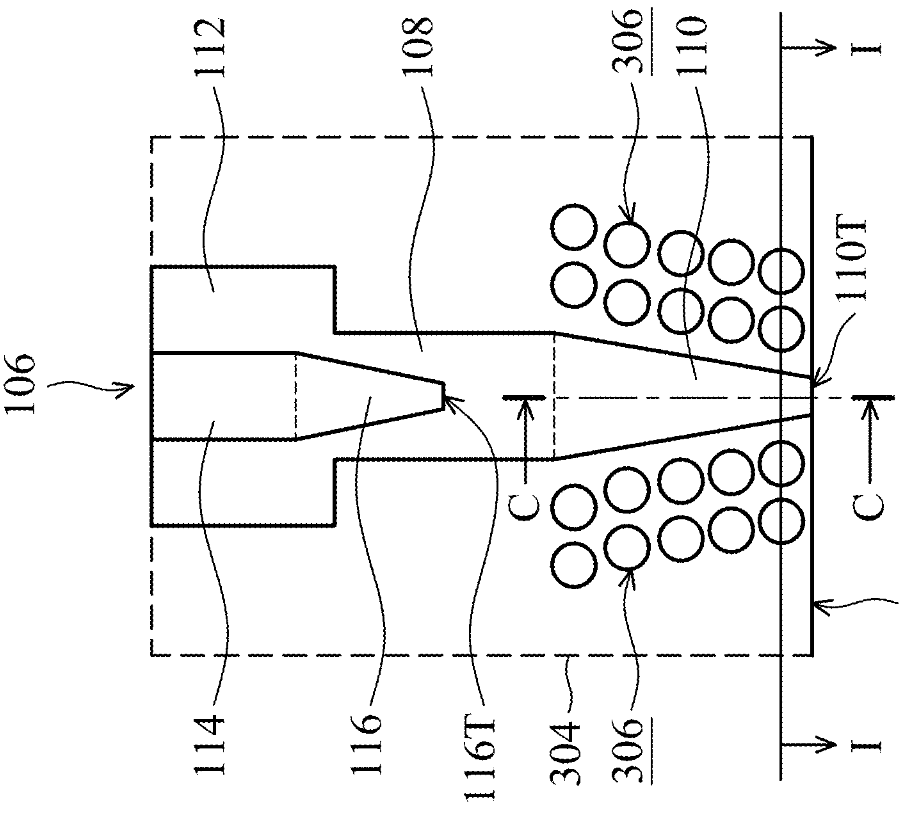

A patterned mask layer 304 is formed over the upper surface of the capping layer 302, as shown in FIGS. 3B, 3B-1 and 3B-2, in accordance with some embodiments. The patterned mask layer 304 has a plurality of opening patterns 306 exposing the upper surface of the capping layer 302, in accordance with some embodiments. In some embodiments, the patterned mask layer 304 is a patterned photoresist layer and may be formed by the photolithography process described above.

The opening patterns 306 of the patterned mask layer 304 are located at opposite sides of the optical coupling region 110 and staggered with the optical coupling region 110, as shown in FIGS. 3B, 3B-1 and 3B-2, in accordance with some embodiments. That is, when viewed from the plan view of FIG. 3B-1, the opening patterns 306 are located around the optical coupling region 110 but do not overlap the optical coupling region 110, in accordance with some embodiments. Although the profiles of the opening patterns 306 are shown as round shapes, opening patterns 306 may have other shapes, such as rectangles, squares, hexagons, trapezoids, triangles, or the like. In some embodiments, each of the opening patterns 306 has a dimension (e.g., diameter, width, or length) in a range from about 100 nm to about 2000 nm. The opening patterns 306 at the left side of the optical coupling region 110 and the opening patterns 306 at the right side of the optical coupling region 110 may be symmetrically distributed along a central axis C-C of the optical coupling region 110.

Figure 3C:
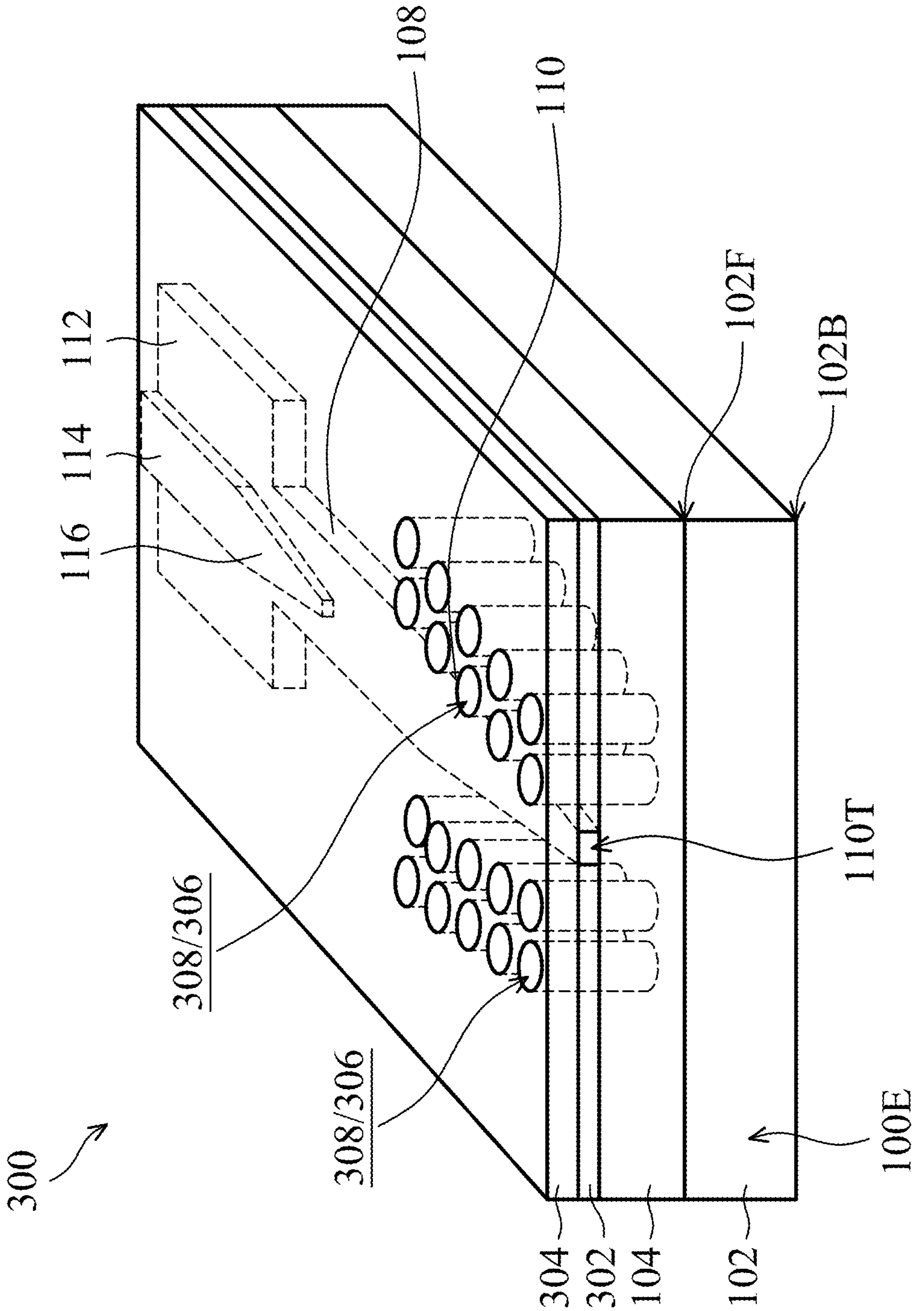
Figures 1, 3C:
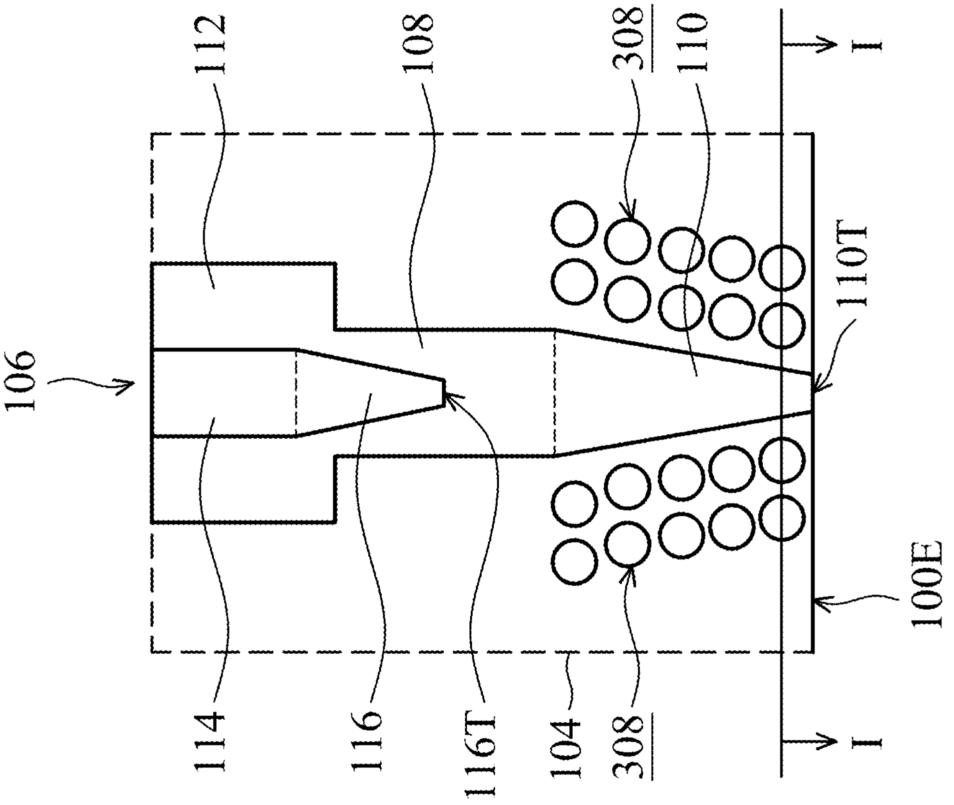
Figures 2, 3C:
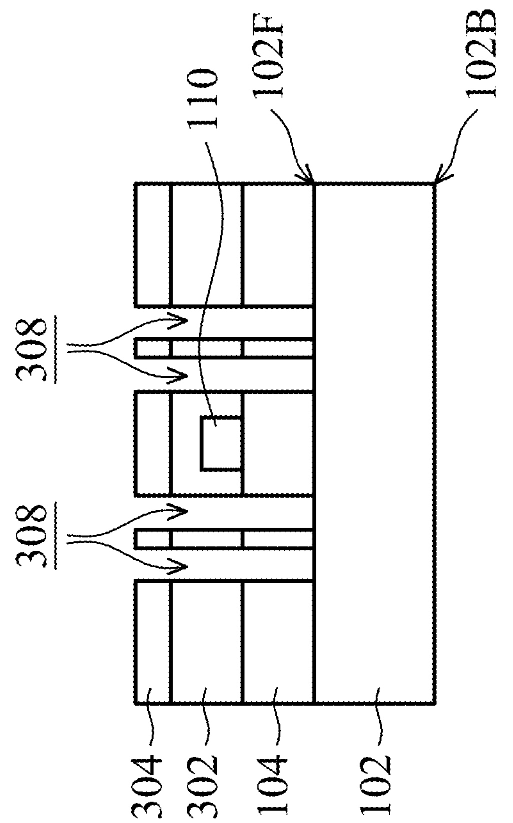

An etching process is performed on the photonic structure 300 using the patterned mask layer 304 such that portions of the capping layer 302 and the buried oxide layer 104 exposed from the opening patterns 306 are removed until the semiconductor substrate 102 is exposed, in accordance with some embodiments. The opening patterns 306 of the patterned mask layer 304 are transferred into the capping layer 302 and the buried oxide layer 104, thereby forming a plurality of through holes 308 through the capping layer 302 and the buried oxide layer 104, as shown in FIGS. 3C, 3C-1 and 3C-2, in accordance with some embodiments. The etching process may be an anisotropic etching process such as a dry plasma etching. For example, the dry plasma etching may use carbon fluoride gas (e.g., $CF_4$ and/or $CHF_3$) as an etchant.

Figure 3D:
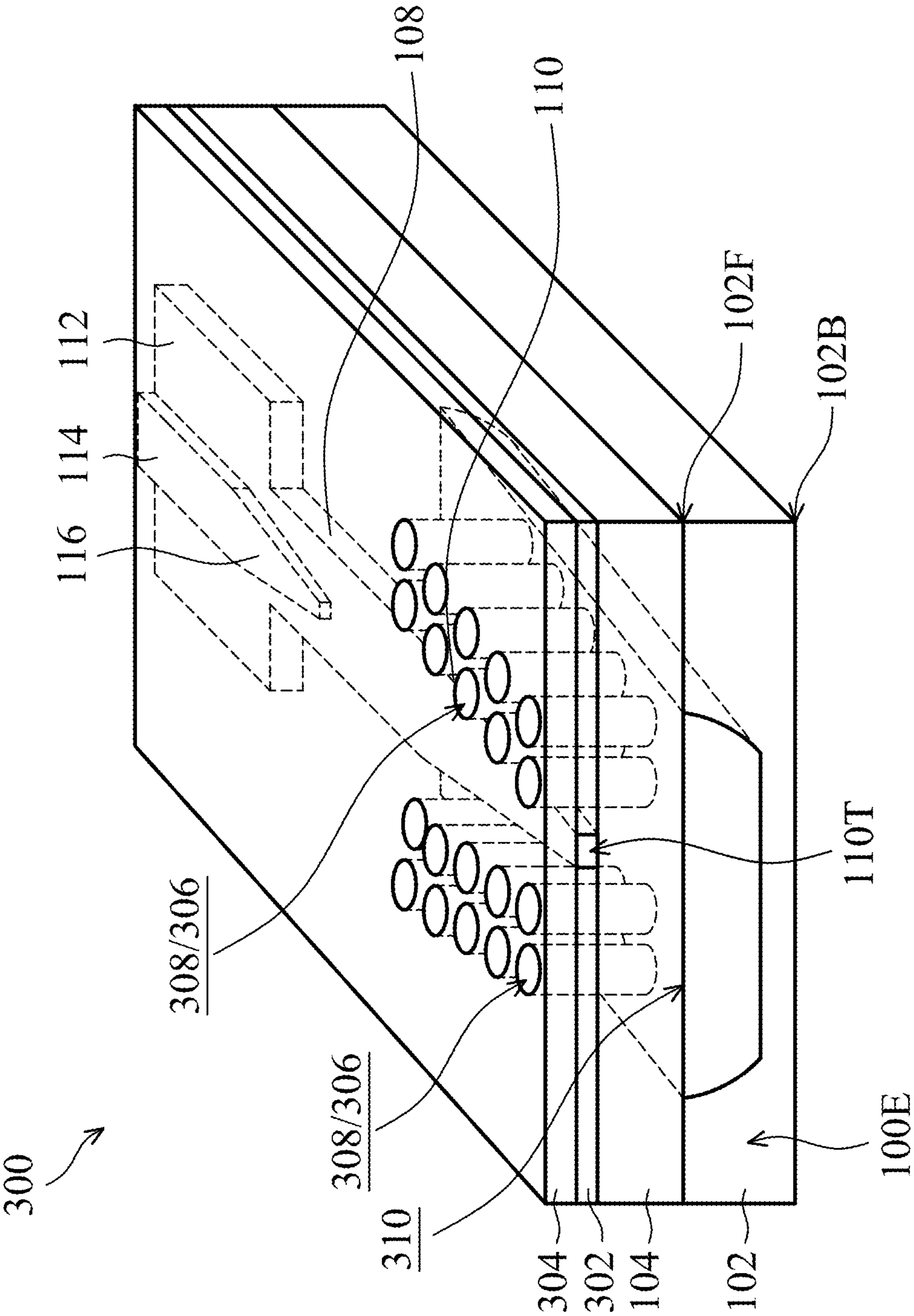
Figures 2, 3D:
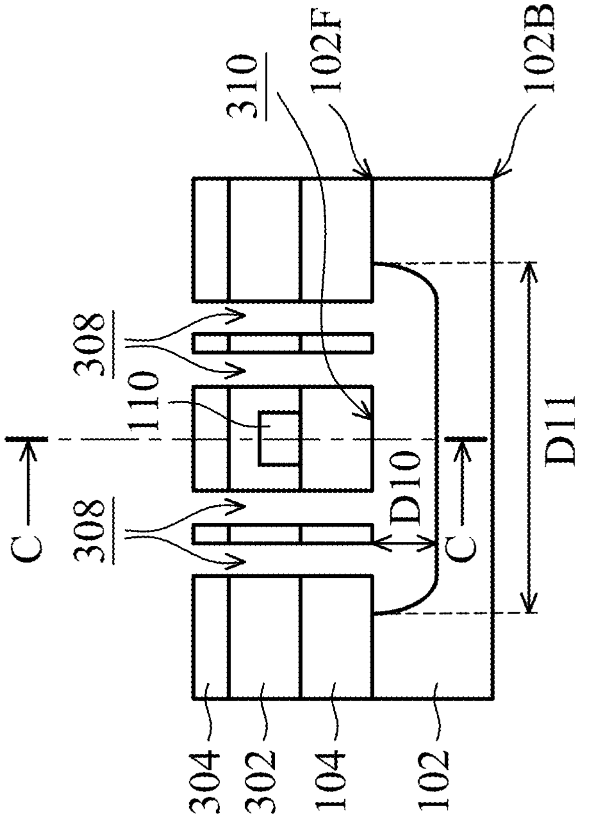
Figures 1, 3D:
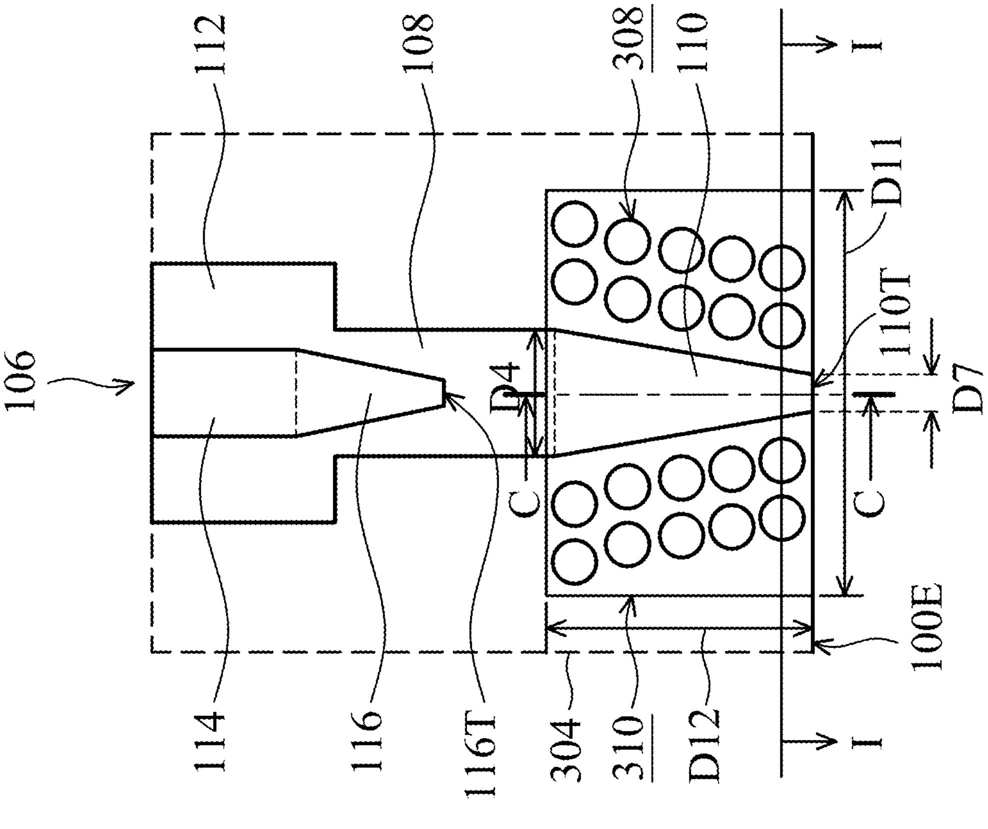

An etching process is performed on the photonic structure 300 using the patterned buried oxide layer 104, thereby forming a trench 310 in the semiconductor substrate 102, as shown in FIGS. 3D, 3D-1 and 3D-2, in accordance with some embodiments. In some embodiments, the etchant is introduced to the through holes 308 and etching the semiconductor substrate 102 exposed from the through holes 308 to form recesses at the frontside surface 102F of the semiconductor substrate 102. Due to the etchant etching the semiconductor substrate 102 vertically and laterally, the recesses expand and merge with one another as the etching process proceeds, thereby forming a single trench 310. The etching depth may be controlled (e.g., by controlling an etching time).

The trench 310 is aligned below the optical coupling region 110, as shown in FIGS. 3D, 3D-1 and 3D-2, in accordance with some embodiments. That is, when viewed from the plan view of FIG. 3D-1, the trench 310 overlaps the optical coupling region 110, in accordance with some embodiments. The trench 310 may overlap a small portion of the first optical transmission region 108 proximate to the optical coupling region 110 but does not overlap most of the first optical transmission region 108. In some embodiments, an area (pattern) of the optical coupling region 110 is substantially entirely located or confined within an area (pattern) of the trench 310 in the plan view of FIG. 3D-1. In the plan view, the pattern of the optical coupling region 110 and the pattern of the trench 310 have a common central axis C-C, which is parallel with the lengthwise direction of the optical coupling region 110.

In some embodiments, the trench 310 has a depth D10 in a range from about 2 μm to about 10 μm, a width D11 in a range from about 7 μm to about 15 μm and a length D12 in a range from about 500 nm to about 12000 nm. In some embodiments, the ratio of the width D11 to the width D7 is in a range from about 47 to about 214. In some embodiments, the ratio of the width D11 to the width D4 is in a range from about 15 to about 40.

Figure 3E:
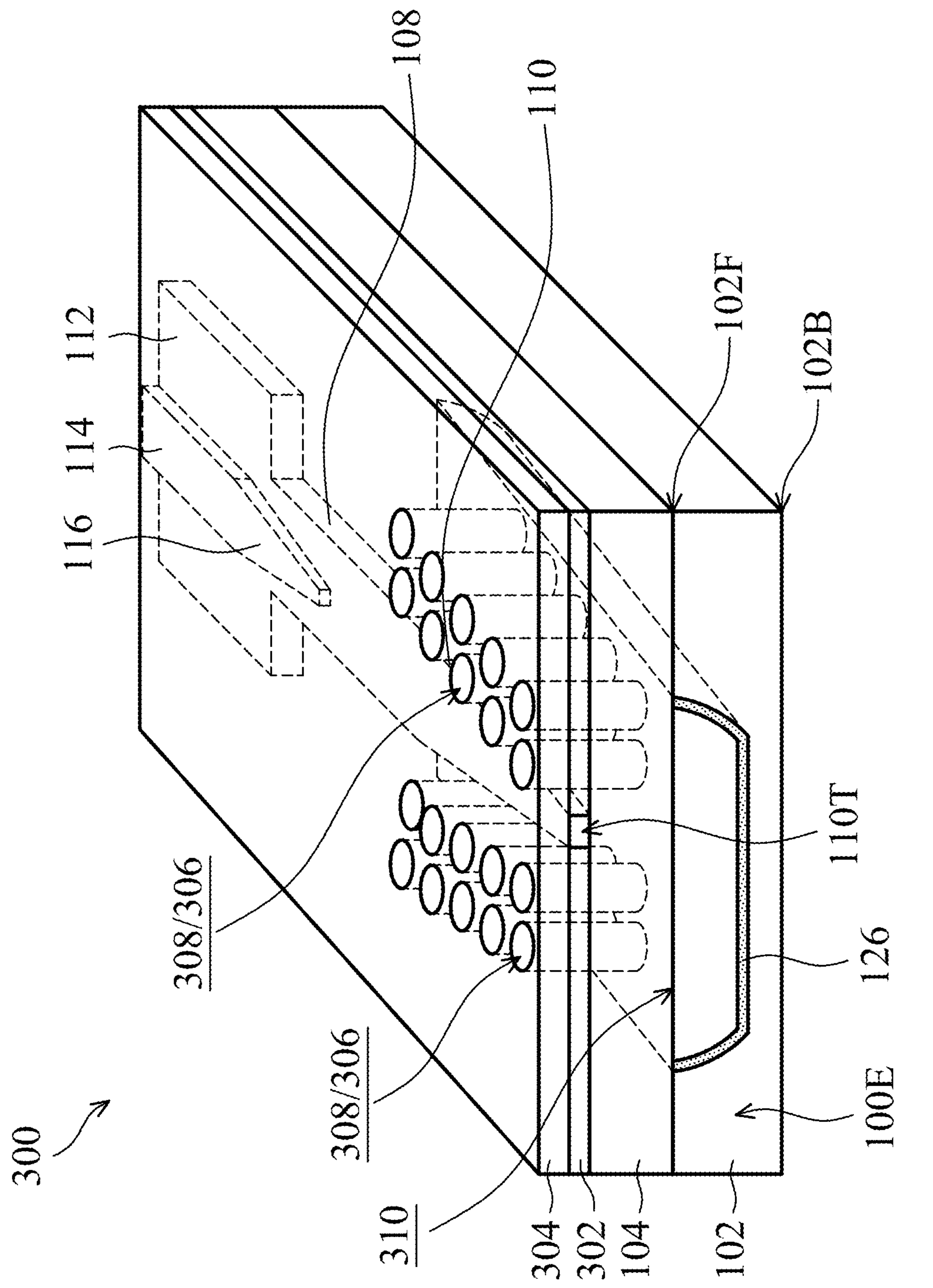

A lining oxide layer 126 is formed in the trench 310, as shown in FIG. 3E, in accordance with some embodiments. The lining oxide layer 126 is formed along the sidewalls and the bottom surface of the trench 310 (i.e., the surfaces of the semiconductor substrate 102 exposed from the trench 310), in accordance with some embodiments. In some embodiments, the lining oxide layer 126 is made of silicon oxide. In some embodiments, the lining oxide layer 126 is formed using thermal oxidation process, CVD process (such as LPCVD, PECVD), ALD process, and/or another suitable technique. In some embodiments, the lining oxide layer 126 has a thickness in a range from about 100 nm to about 1000 nm.

Figure 3F:
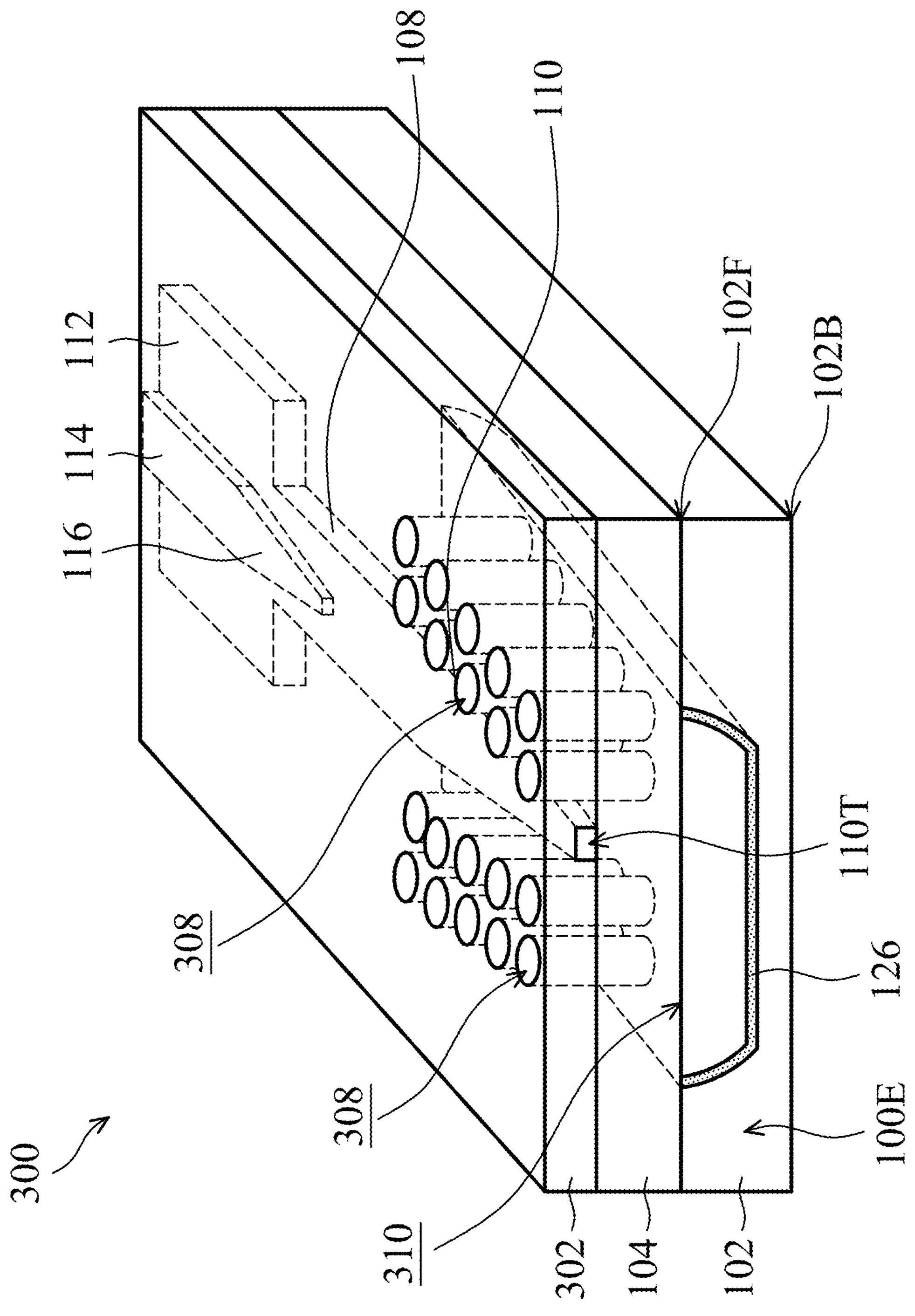

The patterned mask layer 304 is removed using such as an ashing process, thereby exposing the capping layer 302, as shown in FIG. 3F, in accordance with some embodiments.

Figure 3G:
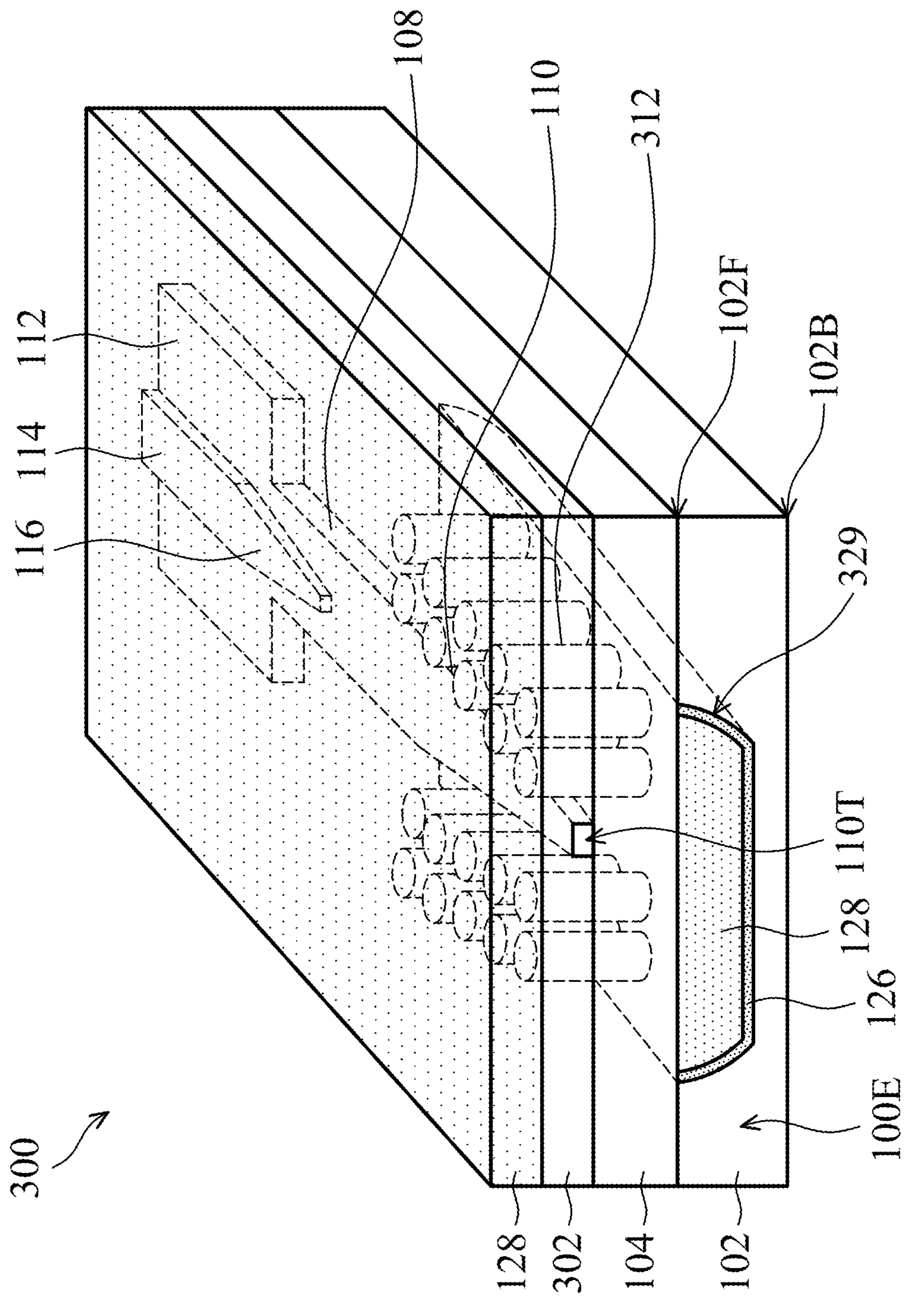
Figures 1, 3G:
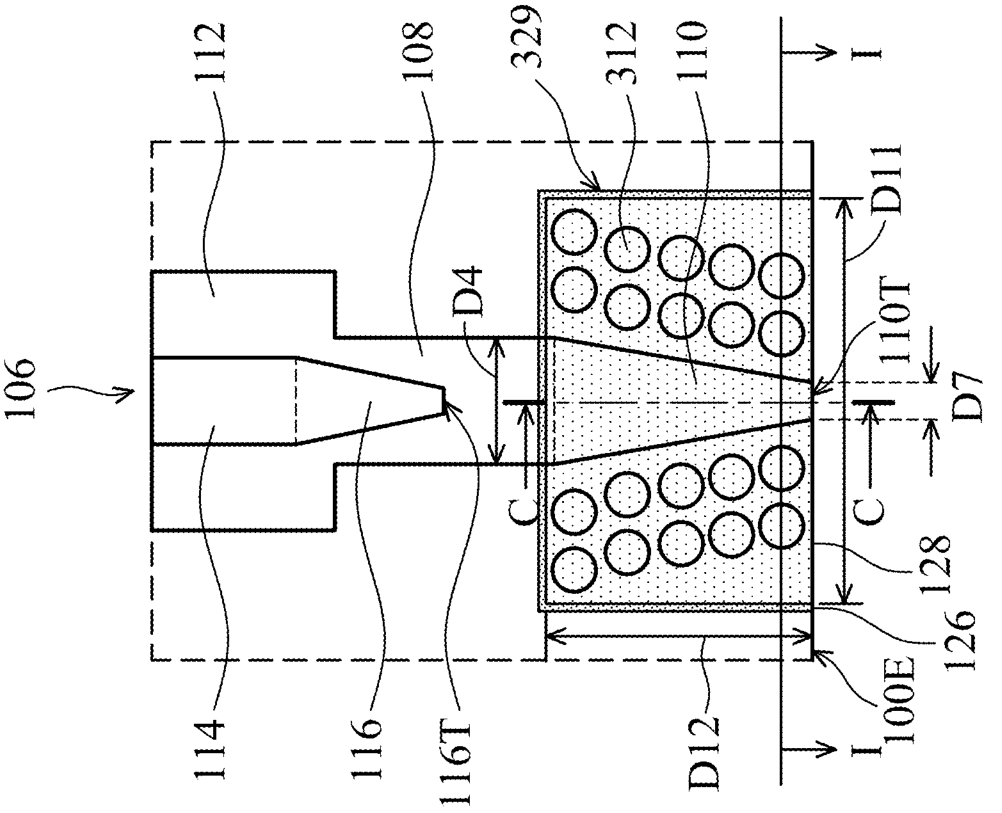
Figures 2, 3G:
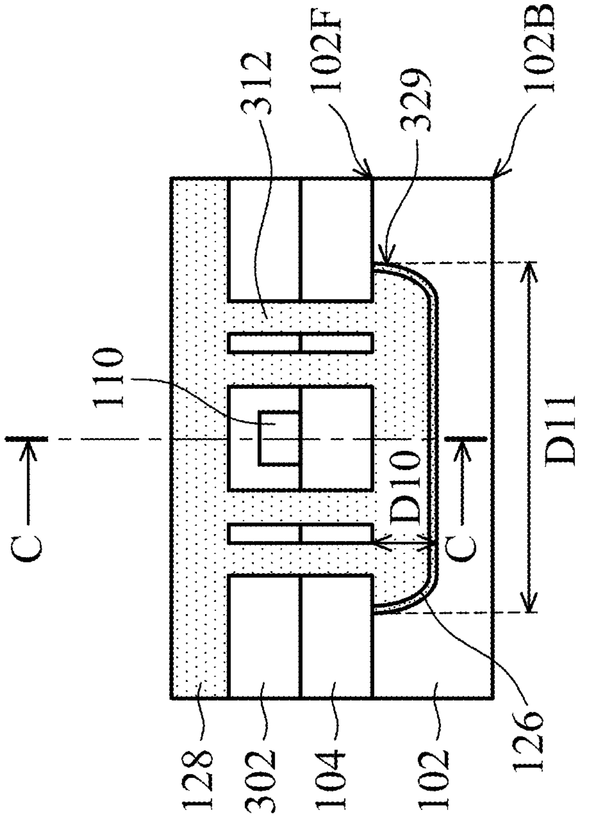

A filled oxide layer 128 is formed over the photonic structure 300, as shown in FIGS. 3G, 3G-1 and 3G-2, in accordance with some embodiments. The filled oxide layer 128 is formed over the lining oxide layer 126 from the trench 310 and overfills the trench 310 and the plurality of through holes 308, in accordance with some embodiments. The filled oxide layer 128 is also formed over the upper surface of the capping layer 302.

In some embodiments, the filled oxide layer 128 is made of silicon oxide-based material, for example, silicon oxide ($SiO_2$), silicon oxynitride (SiON)), TEOS oxide, USG, BPSG, FSG, PSG, BSG, OSG, spin-on-glass, or a combination thereof. In some embodiments, the filled oxide layer 128 is formed using spin-on coating, CVD process (such as LPCVD, PECVD, HDP-CVD, HARP, and FCVD), ALD process, and/or another suitable technique. In the deposition process, voids may be formed and sealed by the oxide layer 128, thereby forming an air void in the filled oxide layer 128.

Portions of the filled oxide layer 128 filling the plurality of through holes 308 are referred to as oxide pillars 312, in accordance with some embodiments. The lining oxide layer 126 and a portion of the filled oxide layer 128 filling the trench 310 combine to form an oxide structure 329, in accordance with some embodiments.

The oxide structure 329 is aligned below the optical coupling region 110, as shown in FIGS. 3G, 3G-1 and 3G-2, in accordance with some embodiments. That is, when viewed from the plan view of FIG. 3G-1, the oxide structure 329 overlaps the optical coupling region 110, in accordance with some embodiments. The oxide structure 329 may overlap a small portion of the first optical transmission region 108 proximate to the optical coupling region 110 but does not overlap most of the first optical transmission region 108. In some embodiments, an area (pattern) of the optical coupling region 110 is substantially entirely located or confined within an area (pattern) of the oxide structure 329 in the plan view of FIG. 3G-1. In the plan view, the pattern of the optical coupling region 110 and the pattern of the oxide structure 329 may have the common central axis C-C.

The oxide pillars 312 are located at opposite sides of the optical coupling region 110 and staggered with the optical coupling region 110, in accordance with some embodiments. That is, when viewed from the plan view of FIG. 3G-1, the oxide pillars 312 are located around the optical coupling region 110 but do not overlap the optical coupling region 110, in accordance with some embodiments. The oxide pillars 312 at the left side of the optical coupling region 110 and the oxide pillars 312 at the right side of the optical coupling region 110 may be symmetrically distributed along the central axis C-C of the optical coupling region 110.

In some embodiments, the oxide structure 329 has a thickness D10 in a range from about 2 μm to about 10 μm. In some embodiments, the oxide structure 329 is thicker than the buried oxide layer. In some embodiments, the ratio of the thickness D10 of the oxide structure 329 to the thickness D2 (FIG. 1A-2) of the buried oxide layer 104 is in a range from about 1 to about 16. If the ratio is too small, a light mode expanding through the optical coupling region 110 may exceed to the oxide structure 329, thereby incurring an optical signal loss.

In some embodiments, the oxide structure 329 has a width D11 in a range from about 7 μm to about 15 μm and a length D12 in a range from about 500 nm to about 12000 nm. In some embodiments, the ratio of the width D11 of the oxide structure 329 to the width D7 of the terminus 110T of the optical coupling region 110 is in a range from about 47 to about 214. In some embodiments, the ratio of the width D11 of the oxide structure 329 to the width D4 of the optical transmission region 108 is in a range from about 15 to about 40. If the width D11 of the oxide structure 329 is too small (or the ratios are too small), a light mode expanding through the optical coupling region 110 may exceed to the oxide structure 329, thereby incurring an optical signal loss. If the width D11 of the oxide structure 329 is too large (or the ratios are too large), it may increase the difficulty and cost of the processes for forming the oxide structure 329.

Figure 3H:
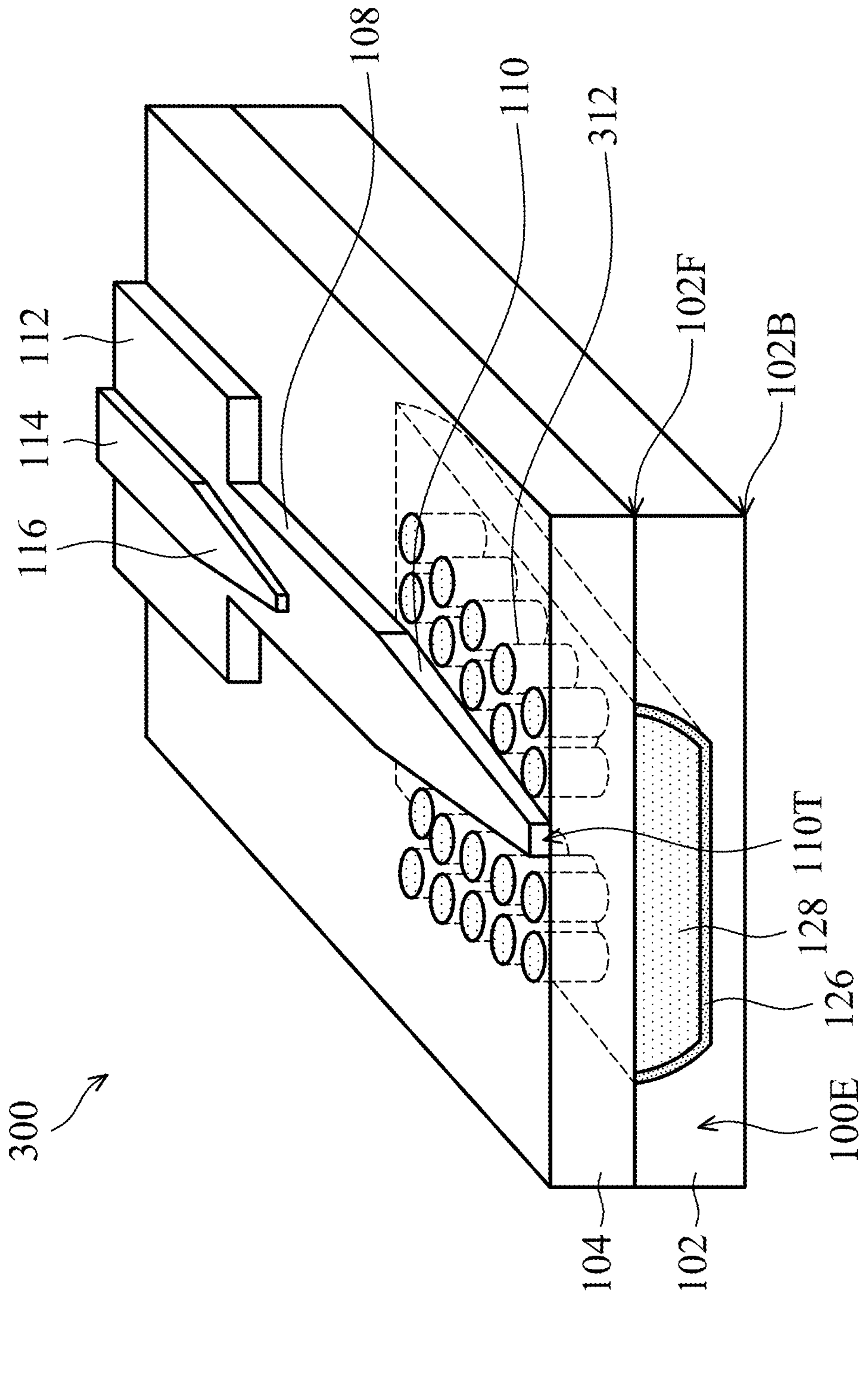

A planarization process is performed on the photonic structure 300 to remove the portion of the filled oxide layer 128 over the upper surface of the capping layer 302 until the capping layer 302 is exposed, in accordance with some embodiments. The planarization process may be a chemical mechanical polish (CMP) process or an etching-back process. The capping layer 302 along with portions of oxide pillars 312 formed in the capping layer 302 is then removed using an etching process, thereby exposing the core layer 106 and the buried oxide layer 104, as shown in FIG. 3H, in accordance with some embodiments. The etching process may be an isotropic etching process such as a wet chemical etching. For example, the wet chemical etching may use dilute hydrofluoric (dHf) acid as an etchant.

Figure 3I:
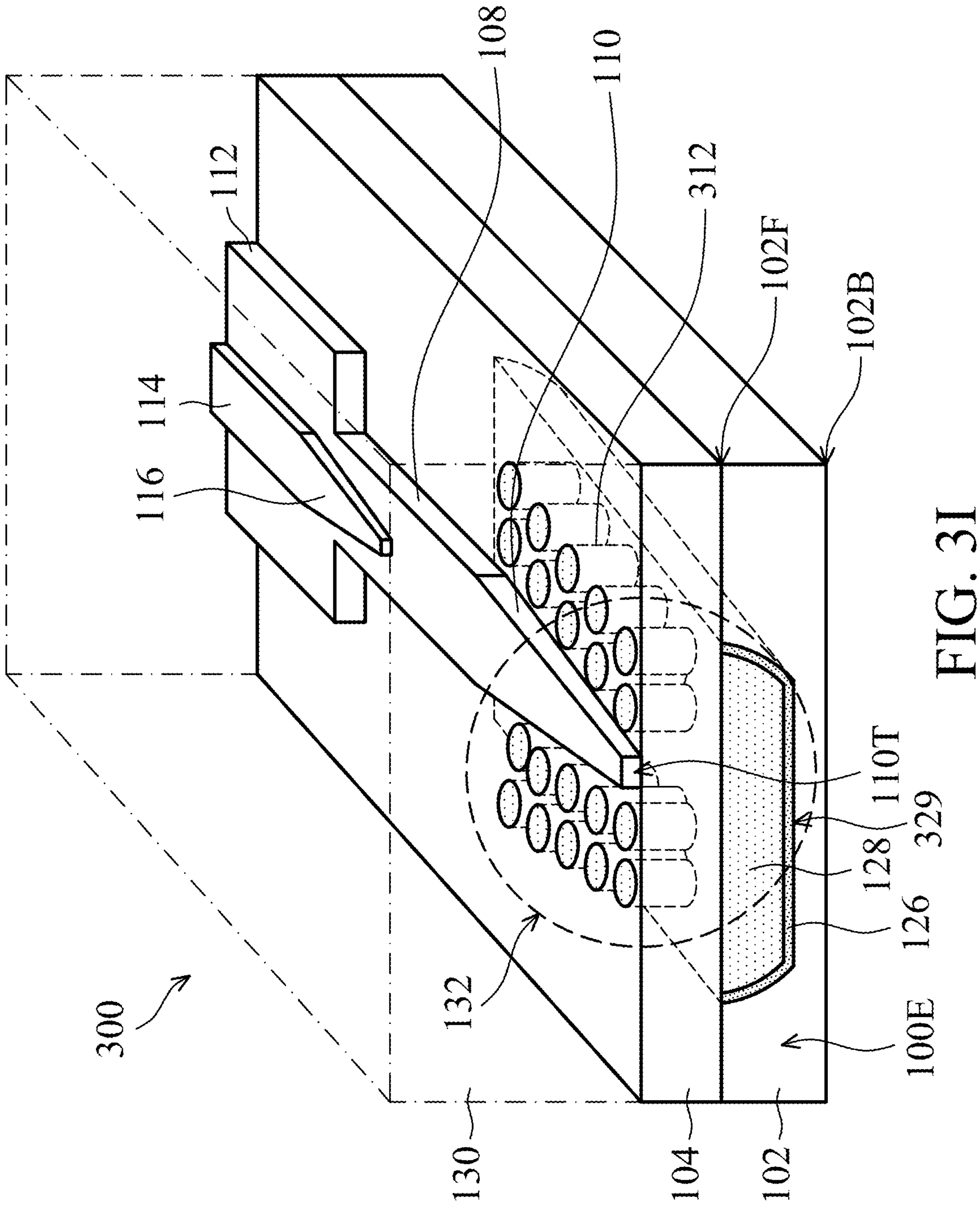
Figures 1, 3I:
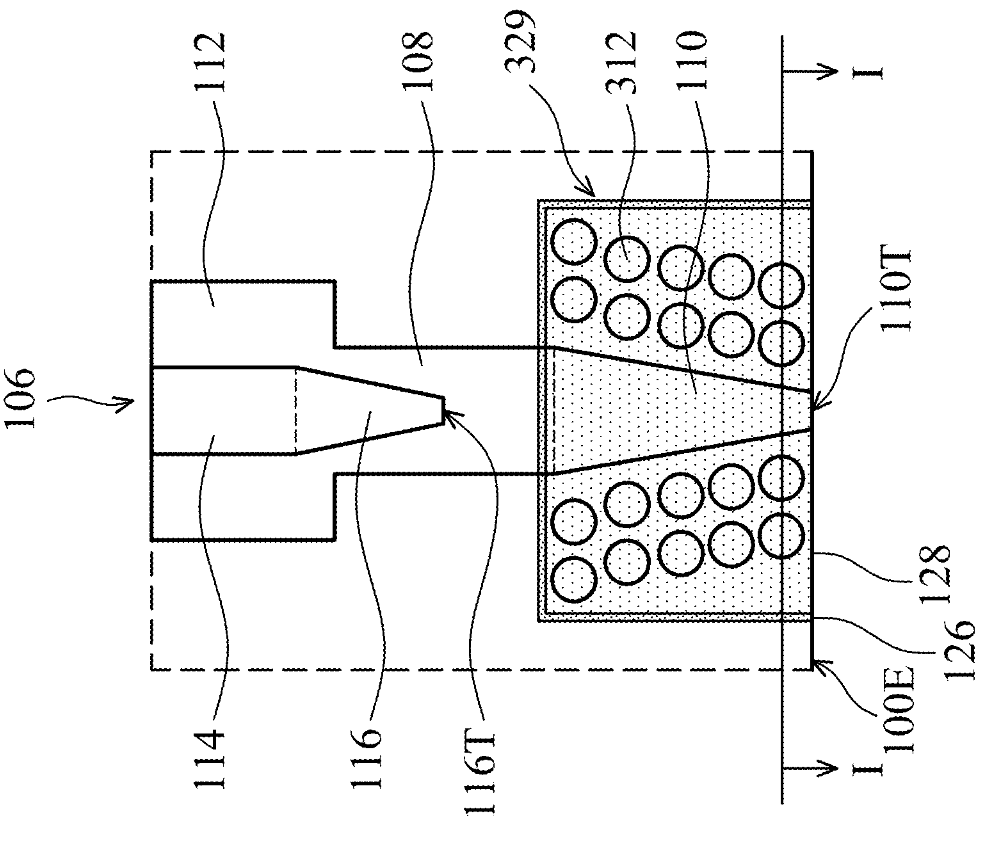
Figures 2, 3I:
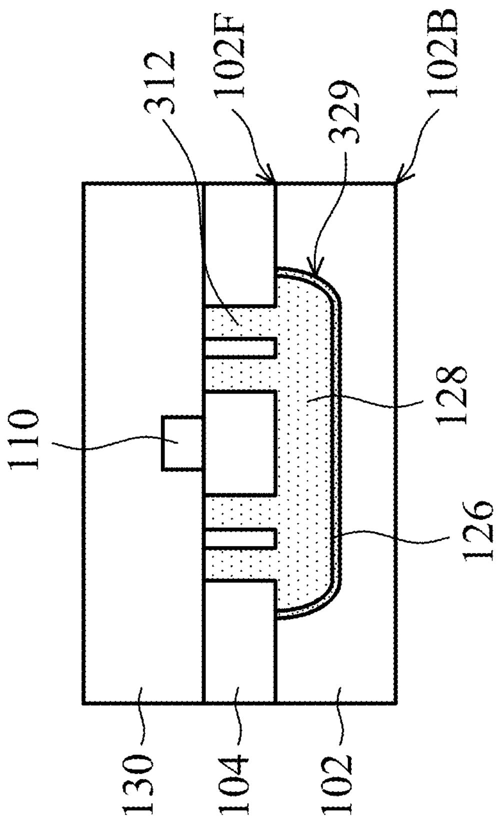

A MLI structure may be formed over the buried oxide layer 104 over the frontside surface 102F of the semiconductor substrate 102 and electrically couples various optical components formed on the semiconductor substrate 102, in accordance with some embodiments. In some embodiments, the multilayer interconnect structure includes a combination of intermetal dielectric layer 130 (as shown in FIGS. 3I and 3I-2 and electrically conductive features (not shown) in the intermetal dielectric layer 130. The material and the formation method of the intermetal dielectric layer 130 may be the same as or similar to the intermetal dielectric layer 130 as described above with respect to FIG. 1I.

After the intermetal dielectric layer 130 is formed, a waveguide structure is produced, in accordance with some embodiments. The waveguide structure includes the silicon core layer 106 and an oxide cladding layer surrounding the core layer 106 and provided by the oxide structure 329 and portions of the intermetal dielectric layer 130 and the buried oxide layer 104 around the silicon core layer 106, in accordance with some embodiments.

The waveguide structure includes an edge coupler which includes the optical coupling region 110 of the core layer 106 and a cladding layer provided by the oxide structure 329 and portions of the intermetal dielectric layer 130 and the buried oxide layer 104 around the optical coupling region 110, in accordance with some embodiments.

The oxide structure 329 used as the cladding layer extends vertically from the frontside surface 102F to an interior of the semiconductor substrate 102, in accordance with some embodiments. The oxide structure 329 is aligned below the tapered optical coupling region 110 and laterally extends from the first optical transition region 108 to the edge 100E of the photonic structure 300, in accordance with some embodiments. A side surface of the oxide structure 329 is exposed from the edge 100E, in accordance with some embodiments. Because the cladding layer of the edge coupler includes the oxide structure 329 which passes through a portion of the semiconductor substrate 102 directly below the optical coupling region 110, the optical signals expanding through the optical coupling region 110 can be prevented from escaping to the semiconductor substrate 102 when the photonic structure 300 is coupled to the optical fiber 132, thereby reducing the optical signal loss of mode conversion.

As described above, the embodiments of the present disclosure provide a photonic structure including an edge coupler. The edge coupler includes an optical coupling region 110 and a cladding layer surrounding the optical coupling region 110. The cladding layer includes a buried oxide layer 104 over a semiconductor substrate 102, an intermetal dielectric layer 130 over the buried oxide layer 104, and an oxide structure 129 (or 329) embedded in the semiconductor substrate 102. An area of the optical coupling region 110 is confined within an area of the oxide structure 129 (or 329) in a plan view, and therefore the optical signals may be prevented from escaping to the semiconductor substrate 102 when the photonic structure is coupled to an external optical fiber 132.

Embodiments of a photonic structure may be provided. The photonic structure may include an optical coupling region over a semiconductor substrate and an oxide structure embedded in the semiconductor substrate. The optical coupling region overlaps the oxide structure in a plan view, and therefore, the optical signals may be prevented from escaping to the semiconductor substrate when the photonic structure is coupled to an external optical fiber.

In some embodiments, a photonic structure is provided. The photonic structure includes an oxide structure surrounded by a semiconductor substrate, a buried oxide layer over the semiconductor substrate, and an optical coupling region over the buried oxide layer. The oxide structure has a first side surface and a second side surface opposite to the first side surface. In a plan view, the optical coupling region is tapered from the first side surface of the oxide structure to the second side surface of the oxide structure.

In some embodiments, a photonic structure is provided. The photonic structure includes an oxide structure in a semiconductor substrate, a plurality of oxide pillars over the oxide structure, and a silicon optical coupling region over the plurality of oxide pillars. The oxide pillars are divided into a first group and a second group. In a plan view, the optical coupling region is located between the first group of oxide pillars and the second group of oxide pillars.

In some embodiments, a method for forming a photonic structure is provided. The method includes forming a silicon optical coupling region over a frontside of a semiconductor substrate, flipping the semiconductor substrate upside down, patterning the semiconductor substrate to form a trench in the semiconductor substrate, depositing an oxide layer to overfill the trench, and polishing the oxide layer until a backside surface of the substrate is exposed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic structure, comprising:

an oxide structure surrounded by a semiconductor substrate;

a buried oxide layer over the semiconductor substrate; and an optical coupling region over the buried oxide layer, wherein the oxide structure has a first side surface and a second side surface opposite to the first side surface, and in a plan view, the optical coupling region is tapered from the first side surface of the oxide structure to the second side surface of the oxide structure.

2. The photonic structure as claimed in claim 1, wherein the second side surface of the oxide structure is exposed from an edge of the semiconductor substrate.

3. The photonic structure as claimed in claim 1, wherein a bottom surface of the oxide structure is exposed from a backside surface of the semiconductor substrate.

4. The photonic structure as claimed in claim 1, further comprising:

an optical transmission region over the buried oxide layer, wherein a width of the optical transmission is substantially consistent along a lengthwise direction of the optical transmission region.

5. The photonic structure as claimed in claim 4, wherein the optical transmission region and the optical coupling region are made of a single continuous silicon layer.

6. The photonic structure as claimed in claim 4, wherein in a plan view, the optical transmission region is located outside an area of the oxide structure.

7. The photonic structure as claimed in claim 4, further comprising:

an interlayer dialectic layer surrounding the optical transmission region and the optical coupling region.

8. The photonic structure as claimed in claim 1, wherein a thickness of the optical coupling region decreases from the first side surface of the oxide structure to the second side surface of the oxide structure.

9. The photonic structure as claimed in claim 1, wherein the oxide structure comprises a fill layer and a lining layer sandwiched between the fill layer and the semiconductor substrate.

10. The photonic structure as claimed in claim 1, wherein the oxide structure is thicker than the buried oxide layer.

11. A photonic structure, comprising:

an oxide structure in a semiconductor substrate;

a plurality of oxide pillars over the oxide structure; and a silicon optical coupling region over the plurality of oxide pillars, wherein the oxide pillars are divided into a first group and a second group, and in a plan view, the optical coupling region is located between the first group of oxide pillars and the second group of oxide pillars.

12. The photonic structure as claimed in claim 11, wherein the plurality of oxide pillars vertically overlaps the oxide structure, and the silicon optical coupling region vertically overlaps the oxide structure.

13. The photonic structure as claimed in claim 11, wherein the oxide pillars are vertically staggered with the silicon optical coupling region.

14. The photonic structure as claimed in claim 11, further comprising:

a buried oxide layer over the semiconductor substrate, wherein the buried oxide layer surrounds the plurality of oxide pillars.

15. The photonic structure as claimed in claim 14, wherein a ratio of a thickness of the oxide structure to a thickness of the buried oxide layer is in a range from about 1 to about 16.

16. A method for forming a photonic structure, comprising:

forming a silicon optical coupling region over a frontside of a semiconductor substrate;

flipping the semiconductor substrate upside down;

patterning the semiconductor substrate to form a trench in the semiconductor substrate;

depositing an oxide layer to overfill the trench; and polishing the oxide layer until a backside surface of the substrate is exposed.

17. The method for forming a photonic structure as claimed in claim 16, wherein the silicon optical coupling region vertically overlaps the trench.

18. The method for forming a photonic structure as claimed in claim 16, wherein in a plan view, the silicon optical coupling region is tapered from a sidewall of the trench to an edge of the semiconductor substrate.

19. The method for forming a photonic structure as claimed in claim 16, wherein patterning the semiconductor substrate to form the trench comprises:

forming a patterned mask layer on the backside surface of the substrate; and etching the substrate using the patterned mask layer.

20. The method for forming a photonic structure as claimed in claim 16, wherein sidewalls of the trench are curved.

* * * * *